United States Patent

Morita et al.

(10) Patent No.: US 9,513,365 B2
(45) Date of Patent: Dec. 6, 2016

(54) RADAR SYSTEM

(71) Applicant: Panasonic Corporation, Osaka (JP)

(72) Inventors: Tadashi Morita, Kanagawa (JP); Takaaki Kishigami, Tokyo (JP)

(73) Assignee: Panasonic Corporation, Osaka (JP)

( * ) Notice: Subject to any disclaimer, the term of this patent is extended or adjusted under 35 U.S.C. 154(b) by 211 days.

(21) Appl. No.: 14/395,453

(22) PCT Filed: Feb. 7, 2014

(86) PCT No.: PCT/JP2014/000681
§ 371 (c)(1),
(2) Date: Oct. 17, 2014

(87) PCT Pub. No.: WO2014/129142
PCT Pub. Date: Aug. 28, 2014

(65) Prior Publication Data
US 2015/0048967 A1 Feb. 19, 2015

(30) Foreign Application Priority Data
Feb. 21, 2013 (JP) .................................. 2013-032002

(51) Int. Cl.
*G01S 7/02* (2006.01)
*G01S 7/282* (2006.01)
(Continued)

(52) U.S. Cl.
CPC ................ *G01S 7/02* (2013.01); *G01S 7/023* (2013.01); *G01S 7/282* (2013.01); *G01S 13/02* (2013.01); *G01S 13/284* (2013.01); *G01S 13/87* (2013.01)

(58) Field of Classification Search
CPC ........ G01S 7/02; G01S 13/284; G01S 7/023; G01S 13/02; G01S 7/282; G01S 13/87

USPC .......................................... 342/59, 27, 70, 189
See application file for complete search history.

(56) References Cited

U.S. PATENT DOCUMENTS

| 2013/0176166 A1 | 7/2013 | Kishigami et al. |
| 2014/0062763 A1* | 3/2014 | Kishigami .............. G01S 13/42 342/158 |

(Continued)

FOREIGN PATENT DOCUMENTS

| JP | 61-96482 A | 5/1986 |
| JP | 2001-251235 A | 9/2001 |

(Continued)

OTHER PUBLICATIONS

International Search Report, mailed Mar. 11, 2014, for International Application No. PCT/JP2014/000681, 4 pages.

*Primary Examiner* — John B Sotomayor
(74) *Attorney, Agent, or Firm* — Seed IP Law Group LLP

(57) ABSTRACT

Respective sector radars generate first and second transmission signals by multiplying any one Spano code sequence and any one orthogonal code sequence, selected among $2^{(N+1)}$ first and second Spano code sequences which are different from each other and $2^{(N+1)}$ first and second orthogonal code sequences which are different from each other, in a predetermined order in each transmission period, where N is an integer of 1 or greater. Respective sector radars convert the first and second transmission signals into first and second high frequency signals, and transmit the first and second high frequency signals through first and second transmission antennas. The $2^{(N+1)}$ first orthogonal code sequences and the $2^{(N+1)}$ second orthogonal code sequences used in the respective sector radars are orthogonal over transmission periods of M multiples of $2^{(N+1)}$, where M is an integer of 2 or greater.

10 Claims, 19 Drawing Sheets

(51) Int. Cl.
*G01S 13/87* (2006.01)
*G01S 13/02* (2006.01)
*G01S 13/28* (2006.01)

(56) References Cited

U.S. PATENT DOCUMENTS

| | | | | |
|---|---|---|---|---|
| 2014/0085127 A1* | 3/2014 | Kishigami | ............... | G01S 13/91 342/108 |
| 2014/0111367 A1* | 4/2014 | Kishigami | ............ | G01S 7/2813 342/21 |
| 2014/0327567 A1* | 11/2014 | Kishigami | .............. | G01S 13/91 342/146 |
| 2015/0061922 A1* | 3/2015 | Kishigami | ............ | G01S 7/2813 342/147 |
| 2015/0168540 A1* | 6/2015 | Morita | .................. | G01S 7/2813 342/21 |
| 2015/0198697 A1* | 7/2015 | Kishigami | ............ | G01S 7/2923 342/145 |
| 2015/0198700 A1* | 7/2015 | Morita | .................. | G01S 13/106 342/59 |
| 2015/0204966 A1* | 7/2015 | Kishigami | ............ | G01S 13/325 342/189 |
| 2015/0247924 A1* | 9/2015 | Kishigami | ............ | G01S 13/931 342/70 |
| 2015/0341203 A1* | 11/2015 | Morita | ................ | H04L 27/3863 375/282 |
| 2015/0369912 A1* | 12/2015 | Kishigami | .............. | G01S 13/26 342/113 |
| 2016/0041260 A1* | 2/2016 | Cao | ......................... | G01S 7/282 342/129 |
| 2016/0154091 A1* | 6/2016 | Yosoku | ................. | G01S 13/286 342/201 |
| 2016/0238694 A1* | 8/2016 | Kishigami | .............. | G01S 7/023 |

FOREIGN PATENT DOCUMENTS

| | | |
|---|---|---|
| JP | 2002-214331 A | 7/2002 |
| JP | 2012-83143 A | 4/2012 |
| WO | 2009/092393 A1 | 7/2009 |
| WO | WO 2014129142 A1 * | 8/2014 ............ G01S 7/282 |

* cited by examiner

FIG. 13

| | a | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| SPANO CODE SEQUENCES #RD1 | SAB | SAB | SAB | SAB | SEF | SEF | SEF | SEF | SAB | SAB | SAB | SAB | SEF | SEF | SEF | SEF | SAB | SAB | SAB | SAB | SEF | SEF | SEF | SEF | SAB | SAB | SAB | SAB | SEF | SEF | SEF | SEF |
| SPANO CODE SEQUENCES #RD2 | SCD | SCD | SCD | SCD | SGH | SGH | SGH | SGH | SCD | SCD | SCD | SCD | SGH | SGH | SGH | SGH | SCD | SCD | SCD | SCD | SGH | SGH | SGH | SGH | SCD | SCD | SCD | SCD | SGH | SGH | SGH | SGH |
| COUNTER VALUE ACT2,BCT2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 |
| COUNTER VALUE ACT3,BCT3 | | 2 | | | 1 | | | 2 | | | 1 | | | 2 | | | 1 | | | 2 | | | 1 | | | 2 | | | 1 | | | 2 |
| COUNTER VALUE ACT4,BCT4 | | | | 2 | | | | 1 | | | | 2 | | | | 1 | | | | 2 | | | | 1 | | | | 2 | | | | 1 |
| COUNTER VALUE ACT5,BCT5 | | | | | 1 | | | | | | | | | | | 2 | | | | | | | | | | | | | | | | 2 |
| COUNTER VALUE ACT6,BCT6 | | | | | | | | | | | | | | | | 1 | | | | | | | | | | | | | | | | 2 |
| ORTHOGONAL CODES 1 #RD1 | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b |
| ORTHOGONAL CODES 1 #RD2 | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b |
| ORTHOGONAL CODES 2 #RD1 | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a | OCR1b | OCR1a |
| ORTHOGONAL CODES 2 #RD2 | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a | OCR2b | OCR2a |
| ORTHOGONAL CODES 3 #RD1 | OCP1a1 | OCP1b1 | OCP1a1 | OCP1b1 | OCP1a2 | OCP1b2 | OCP1a2 | OCP1b2 | OCP1a1 | OCP1b1 | OCP1a1 | OCP1b1 | OCP1a2 | OCP1b2 | OCP1a2 | OCP1b2 | OCP1a1 | OCP1b1 | OCP1a1 | OCP1b1 | OCP1a2 | OCP1b2 | OCP1a2 | OCP1b2 | OCP1a1 | OCP1b1 | OCP1a1 | OCP1b1 | OCP1a2 | OCP1b2 | OCP1a2 | OCP1b2 |
| ORTHOGONAL CODES 3 #RD2 | OCP2a1 | OCP2b1 | OCP2a1 | OCP2b1 | OCP2a2 | OCP2b2 | OCP2a2 | OCP2b2 | OCP2a1 | OCP2b1 | OCP2a1 | OCP2b1 | OCP2a2 | OCP2b2 | OCP2a2 | OCP2b2 | OCP2a1 | OCP2b1 | OCP2a1 | OCP2b1 | OCP2a2 | OCP2b2 | OCP2a2 | OCP2b2 | OCP2a1 | OCP2b1 | OCP2a1 | OCP2b1 | OCP2a2 | OCP2b2 | OCP2a2 | OCP2b2 |
| ORTHOGONAL CODES 4 #RD1 | OCQ1a | | | | | | | | | | | | | | | OCQ1b | | | | | | | | | | | | | | | | |
| ORTHOGONAL CODES 4 #RD2 | OCQ2a | | | | | | | | | | | | | | | OCQ2b | | | | | | | | | | | | | | | | |

FIG. 17

| | a⟶ | | | | | | | | | | | | | | | | | |
|---|---|---|---|---|---|---|---|---|---|---|---|---|---|---|---|---|---|---|
| SPANO CODE SEQUENCES #RD1 | SAB | SEF | SAB | SEF | SAB | SEF | SAB | SEF | SAB | SEF | SAB | SEF | SAB | SEF | SAB | SEF | SAB | SEF |
| SPANO CODE SEQUENCES #RD2 | SCD | SGH | SCD | SGH | SCD | SGH | SCD | SGH | SCD | SGH | SCD | SGH | SCD | SGH | SCD | SGH | SCD | SGH |
| COUNTER VALUE ACT2,BCT2 | 1 | 2 | 1 | 2 | 1 | 2 | 1 | 2 | 1 | 2 | 1 | 2 | 1 | 2 | 1 | 2 | 1 | 2 |
| COUNTER VALUE ACT3,BCT3 | | 2 | 1 | | | 2 | 1 | | | 2 | 1 | | | 2 | 1 | | | 2 |
| COUNTER VALUE ACT4,BCT4 | | | | 1 | 2 | | | | | | | 2 | 1 | | | | | |
| COUNTER VALUE ACT5,BCT5 | | | | | | 1 | 2 | | | | | | | | | | | |
| ORTHOGONAL CODES 1 #RD1 | OCX1a | OCX1b | OCX1b | OCX1a | OCX1a | OCX1b | OCX1b | OCX1a | OCX1a | OCX1b | OCX1b | OCX1a | OCX1a | OCX1b | OCX1b | OCX1a | OCX1a | OCX1b |
| ORTHOGONAL CODES 1 #RD2 | OCX2a | OCX2b | OCX2b | OCX2a | OCX2a | OCX2b | OCX2b | OCX2a | OCX2a | OCX2b | OCX2b | OCX2a | OCX2a | OCX2b | OCX2b | OCX2a | OCX2a | OCX2b |
| ORTHOGONAL CODES 2 #RD1 | OCP1a1 | OCP1b1 | OCP1b1 | OCP1a1 | OCP1a2 | OCP1b2 | OCP1b2 | OCP1a2 | OCP1a1 | OCP1b1 | OCP1b1 | OCP1a1 | OCP1a2 | OCP1b2 | OCP1b2 | OCP1a2 | OCP1a1 | OCP1b1 |
| ORTHOGONAL CODES 2 #RD2 | OCP2a1 | OCP2b1 | OCP2b1 | OCP2a1 | OCP2a2 | OCP2b2 | OCP2b2 | OCP2a2 | OCP2a1 | OCP2b1 | OCP2b1 | OCP2a1 | OCP2a2 | OCP2b2 | OCP2b2 | OCP2a2 | OCP2a1 | OCP2b1 |
| ORTHOGONAL CODES 3 #RD1 | OCQ1a | | | | | | | | OCQ1b | | | | | | | | | |
| ORTHOGONAL CODES 3 #RD2 | OCQ2a | | | | | | | | OCQ2b | | | | | | | | | |

RADAR SYSTEM

TECHNICAL FIELD

The present disclosure relates to a radar system that includes plural radar apparatuses that transmit high frequency signals (for example, microwaves or millimeter waves).

BACKGROUND ART

For detecting the presence or absence of a target (for example, a vehicle or a person) in a wide angle range, a measurement technique using plural radar apparatuses (hereinafter, referred to as "sector radars") has been proposed. For example, Patent Literature 1 discloses a radar system that suppresses interference between sector radars by using complementary codes as transmission codes in plural (for example, two) sector radars.

Two radar systems P and Q disclosed in Patent Literature 1 perform transmission and reception by carrier waves of the same frequency band using P1 and P2 in the radar system P and using Q1 and Q2 in the radar system Q as coded pulses of complete complementary sequences that are different from each other.

When the own radar system receives plural coded pulses transmitted by the own radar system, the own radar system outputs plural autocorrelation function signals $R_{P1P1}(\tau)$ and $R_{P2P2}(\tau)$ or $R_{Q1Q1}(\tau)$ and $R_{Q2Q2}(\tau)$ corresponding to the plural coded pulses P1 and P2 or Q1 and Q2. On the other hand, when the own radar system receives plural coded pulses transmitted by the other radar system, the own radar system outputs plural cross-correlation function signals $R_{Q1P1}(\tau)$ and $R_{Q2P2}(\tau)$ or $R_{P1Q1}(\tau)$ and $R_{P2Q2}(\tau)$ corresponding to the plural coded pulses transmitted by the other radar system.

From a characteristic of the complete complementary sequences, the sum of the plural outputs of the autocorrelation functional signals ($R_{P1P1}(\tau)+R_{P2P2}(\tau)$ or $R_{Q1Q1}(\tau)+R_{Q2Q2}(\tau)$) becomes zero when $\tau$ is not zero, and the sum of the plural outputs of the cross-correlation functional signals ($R_{Q1P1}(\tau)+R_{Q2P2}(\tau)$ or $R_{P1Q1}(\tau)+R_{P2Q2}(\tau)$) becomes zero regardless of the value of $\tau$.

Accordingly, with respect to the plural coded pulses (P1 and P2 or Q1 and Q2) transmitted by the own radar system, a reception side calculates plural autocorrelation function signals corresponding to the respective pulses, to thereby make it possible to obtain a compressed pulse in which a side lobe is not present, and even though the reception side receives the plural coded pulses transmitted by the other radar system, it is possible to make a signal component of the other radar system be zero in the process of calculating the sum of the autocorrelation function signals. Thus, even though the radar systems use the same frequency band in adjacent frequency bands, it is possible to mutually suppress interference.

CITATION LIST

Patent Literature

Patent Literature 1: JP-A-61-096482

SUMMARY OF INVENTION

Technical Problem

The inventors have reviewed a radar system that includes plural radar apparatuses that transmit high frequency signals (for example, microwaves or millimeter waves). However, the technique disclosed in Patent Literature 1 does not consider an operation of the radar system when a phase rotation occurs in reception signals according to fluctuation of the Doppler frequency (for example, when a target moves during measurement). In the radar system in the related art, when the phase rotation occurs in the reception signals according to fluctuation of the Doppler frequency, a correlation characteristic of the reception signals deteriorates.

In order to solve the above-mentioned problem, an object of the present disclosure is to provide a radar system that suppresses, even when a phase rotation occurs in reception signals according to fluctuation of the Doppler frequency, deterioration of a correlation characteristic of the reception signals, and suppresses interference between plural sector radars.

Solution to Problem

According to an aspect of the present disclosure, there is provided a radar system that includes at least two sector radars. The radar system includes a first sector radar and a second sector radar, in which the first sector radar includes a first transmission signal generator that generates a first transmission signal by multiplying any one first Spano code and any one first orthogonal code, selected among $2^{(N+1)}$ first Spano code sequences and $2^{(N+1)}$ first orthogonal code sequences, in a predetermined order in each transmission period, where N is an integer of 1 or greater, and a first transmission RF section that converts the first transmission signal into a first high frequency signal and transmits the first high frequency signal through a first transmission antenna, and in which the second sector radar includes a second transmission signal generator that generates a second transmission signal by multiplying any one second Spano code and any one second orthogonal code, selected among $2^{(N+1)}$ second Spano code sequences and $2^{(N+1)}$ second orthogonal code sequences, in a predetermined order in each transmission period, and a second transmission RF section that converts the second transmission signal into a second high frequency signal and transmits the second high frequency signal through a second transmission antenna. The $2^{(N+1)}$ first orthogonal code sequences and the $2^{(N+1)}$ second orthogonal code sequences are orthogonal to each other over transmission periods of M multiples of $2^{(N+1)}$, where M is an integer of 2 or greater.

Advantageous Effects of Invention

According to the present disclosure, even when the phase rotation occurs in the reception signals according to fluctuation of the Doppler frequency, radar system is capable to suppress deterioration of the correlation characteristic of the reception signals and to suppress interference between the plural sector radars.

BRIEF DESCRIPTION OF DRAWINGS

FIG. 13 is a diagram illustrating an example of the relationship between Spano code sequences, respective counter values, and orthogonal codes used in each sector radar according to the third embodiment.

FIG. 17 is a diagram illustrating an example of the relationship between Spano code sequences, respective counter values, and orthogonal codes used in each sector radar, according to the fourth embodiment.

DESCRIPTION OF EMBODIMENTS (Background of Respective Embodiments)

Figure 1:
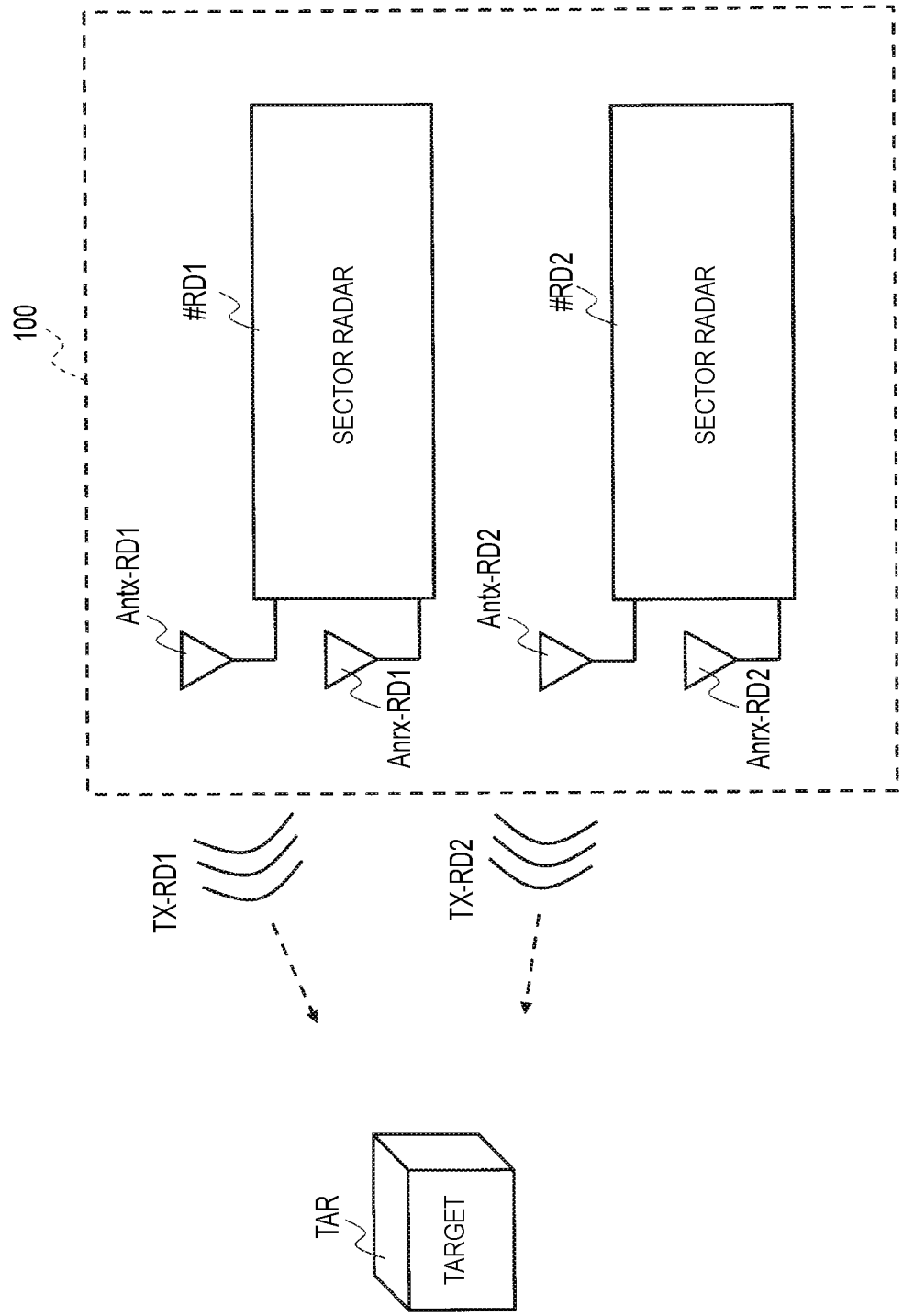
FIG. 1 is a diagram illustrating a state where a radar transmission. signal is transmitted to a target from a radar system.
Figure 2:
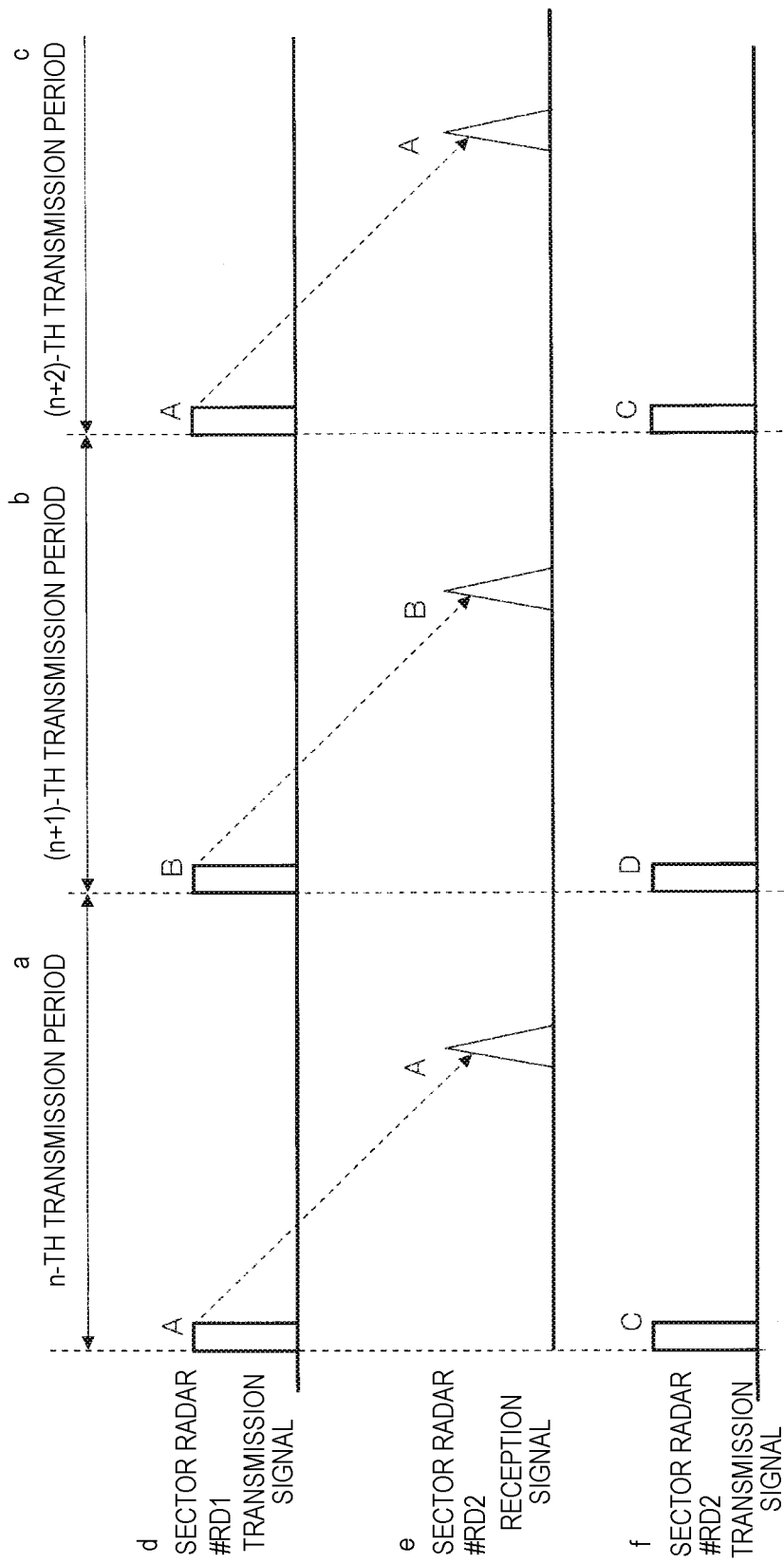
FIG. 2 is a diagram illustrating interference generated in a sector radar #RD2 when a radar transmission signal transmitted from a sector radar #RD1 is received in the sector radar #RD2.

First, before description of embodiments of a radar system according to the present disclosure, problems of a radar system in the related art will be described with reference to FIGS. 1 to 5. FIG. 1 is a diagram illustrating a state where a radar transmission signal is transmitted to a target from a radar system. FIG. 2 is a diagram illustrating interference generated in a sector radar #RD2 when a radar transmission signal transmitted from a sector radar #RD1 is received in the sector radar #RD2.

Figure 3:
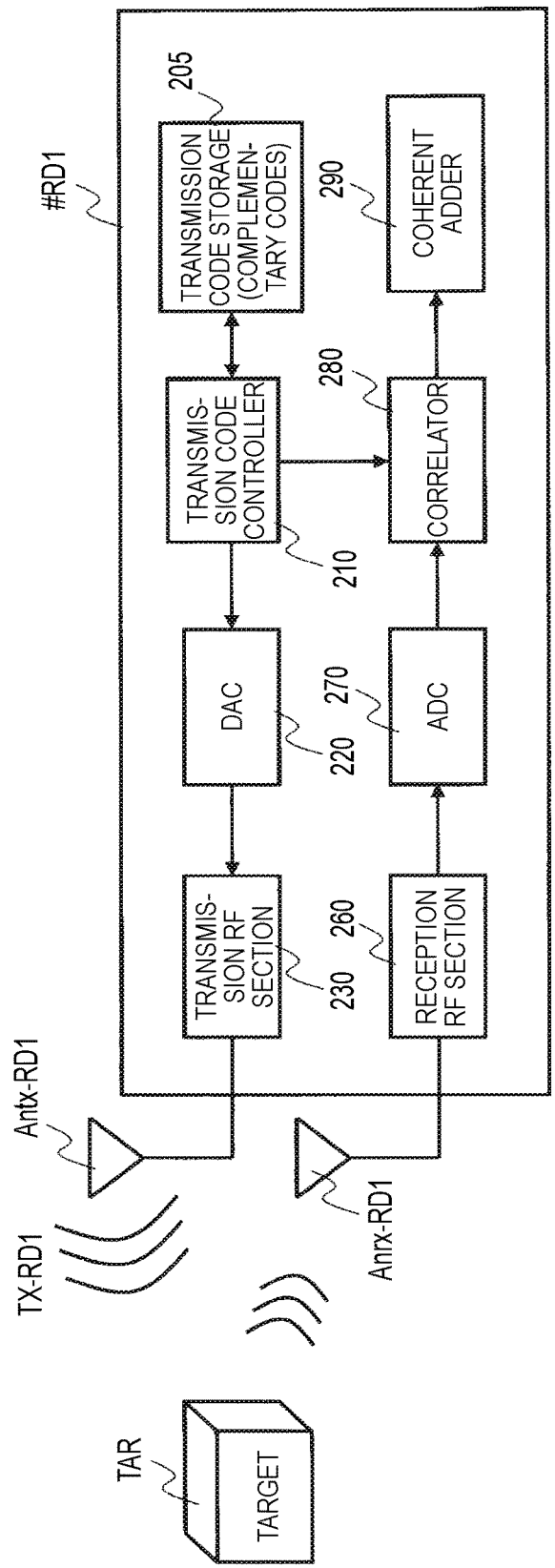
FIG. 3 is a block diagram illustrating a first configuration example of a sector radar in the related art.
Figure 4:
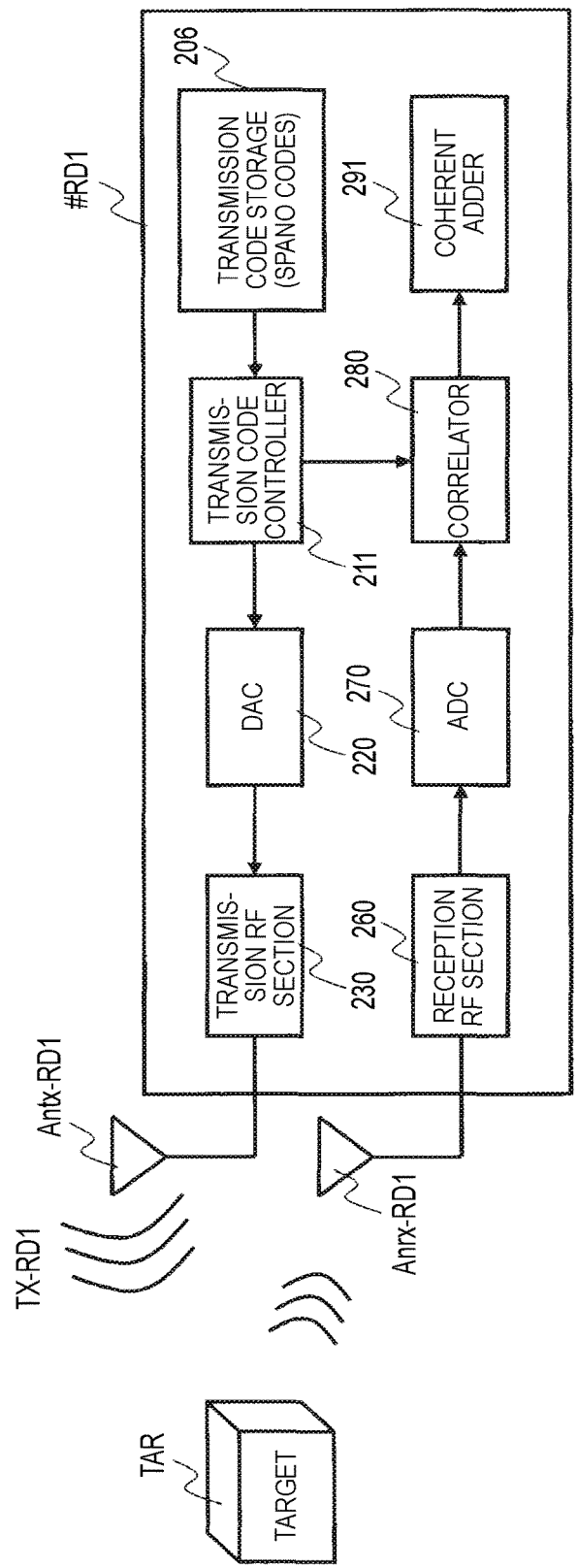
FIG. 4 is a block diagram illustrating a second configuration example of a sector radar in the related art.
Figure 5:
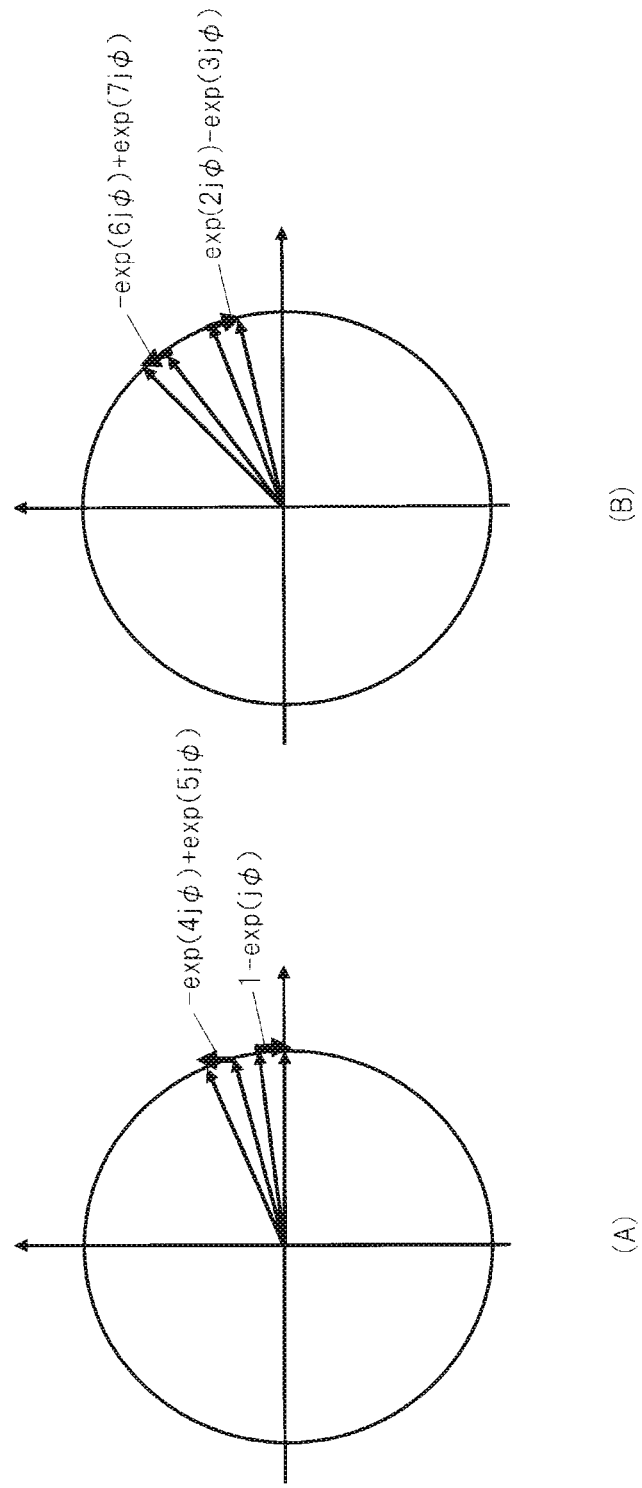
In FIGS. 5, (A) and (B) are diagrams illustrating cancellation of a phase rotation generated according to fluctuation of the Doppler frequency.

FIG. 3 is a block diagram illustrating a first configuration example of the sector radar in the related art. FIG. 4 is a block diagram illustrating a second configuration example of the sector radar in the related art. In FIG. 5, (A) and (B) are diagrams illustrating cancellation of a phase rotation generated according to fluctuation of the Doppler frequency.

In the following description, complementary codes refer to codes that use two complementary code sequences ($A_n$ and $B_n$) that form a pair, for example. The complementary codes have a characteristic that a side lobe of zero is obtained except for peak values of autocorrelation values by addition of the respective autocorrelation values in which delay times τ (sec) are matched with each other in respective autocorrelation arithmetic operation results of one complementary code sequence $A_n$ and the other complementary code sequence $B_n$. Parameter n is 1, 2 to L (code sequence length (code length)). Further, in the following description, the notation of the parameter n is omitted, and the notation of code sequence A or B is shown.

A radar system 100 shown in FIG. 1 includes plural (for example, two) sector radars #RD1 and #RD2, and detects the presence or absence of a target TAR (for example, an automobile or a person) in a wide angle range. The two sector radars #RD1 and #RD2 have the same configuration.

The sector radar #RD1 transmits a radar transmission signal TX-RD1 through a transmission antenna Antx-RD1, and receives a reflected wave signal reflected by the target TAR through a reception antenna Anrx-RD1.

The sector radar #RD2 transmits a radar transmission signal TX-RD2 through a transmission antenna Antx-RD2, and receives a reflected wave signal reflected by the target TAR through a reception antenna Anrx-RD2.

The sector radar #RD1 transmits the radar transmission signal TX-RD1 generated by using one code sequence A that forms the pair of complementary codes (A and B) in an n-th transmission period shown in FIG. 2, and transmits the radar transmission signal TX-RD1 generated by using the other code sequence B that forms the pair of complementary codes (A and B) in an (n+1)-th transmission period shown in FIG. 2. Further, in an (n+2)-th transmission period shown in FIG. 2, and thereafter, the sector radar #RD1 transmits the same radar transmission signal TX-RD1 in the n-th transmission period and in the (n+1)-th transmission period, as in the unit of two transmission periods of the n-th transmission period and the (n+1)-th transmission period.

Similarly, the sector radar #RD2 transmits the radar transmission signal TX-RD2 generated using one code sequence C that forms a pair of complementary codes (C and D) in the n-th transmission period shown in FIG. 2, and transmits the radar transmission signal TX-RD2 generated using the other code sequence D that forms the pair of complementary codes (C and D) in the (n+1)-th transmission period shown in FIG. 2. Further, in the (n+2)-th transmission period shown in FIG. 2, and thereafter, the sector radar #RD2 transmits the same radar transmission signal TX-RD2 in the n-th transmission period and in the (n+1)-th transmission period, as in the unit of two transmission periods of the n-th transmission period and the (n+1)-th transmission period.

For example, it is assumed that the reflected wave signal obtained as the radar transmission signal. TX-RD1 transmitted from the sector radar #RD1 in the n-th transmission period is reflected by the target and is received in the sector radar #RD2 (see FIG. 2).

In the n-th transmission period, the sector radar #RD2 generates the radar transmission signal TX-RD2 using the transmission code C. Thus, in the n-th transmission period, when the reflected wave signal of the radar transmission signal TX-RD1 generated by using the transmission code A is received in the sector radar #RD2, since the sector radar #RD2 also receives the reflected wave signal of the radar transmission signal TX-RD2 using the transmission code C, interference occurs by the two reflected wave signals.

Here, the sector radars #RD1 and #RD2 add autocorrelation values of the radar transmission signals TX-RD1 and TX-RD2 transmitted by the sector radars #RD1 and #RD2 in the n-th and (n+1)-th transmission periods and the respective reflected wave signals reflected by the target TAR and obtain a correlation characteristic in which a side lobe is suppressed. Accordingly, when interference due to the radar transmission signal TX-RD1 transmitted by the sector radar #RD1 occurs in the sector radar #RD2, the correlation characteristic of the reception signals in the sector radar #RD2 deteriorates. Thus, the detection accuracy of the target TAR in the sector radar #RD2 deteriorates.

Although the detailed description is omitted, in the (n+1)-th transmission period shown in FIG. 2, similarly, the interference occurs in the sector radar #RD2. Further, although the detailed description is omitted, for example, when the reflected wave signal of the radar transmission signal TX-RD2 generated with the transmission code C is received in the sector radar #RD1 in the n-th transmission period, the interference occurs in the sector radar #RD1.

Next, a configuration and an operation of the sector radar #RD1 shown in FIG. 3 which corresponds to the respective sector radars that form the radar system 100 shown in FIG. 1 will be described.

FIG. 3 shows an internal configuration of the sector radar #RD1 among two sector radars #RD1 and #RD2 that form the radar system 100 shown in FIG. 1, for example. The sector radar #RD1 shown in FIG. 3 includes a transmission code storage (complementary codes) 205, a transmission code controller 210, a digital analog converter (DAC) 220, a transmission RF section 230 to which the transmission antenna Antx-RD1 is connected, a reception RF section 260 to which the reception antenna Anrx-RD1 is connected, an analog digital converter (ADC) 270, a correlator 280, and a coherent adder 290. Two sector radars #RD1 and #RD2 are operated in a similar way.

The transmission code storage (complementary codes) 205 stores the code sequences A and B that form the pair of complementary codes (A and B), for example, as code sequences used for generation of the radar transmission signal TX-RD1 by the sector radar #RD1. A transmission code storage (not shown) of the sector radar #RD2 corresponding to the sector radar #RD1 shown in FIG. 3 stores the code sequences C and D that form the pair of complementary codes (C and D), for example, as code sequences used for generation of the radar transmission signal TX-RD2 by the sector radar #RD2. The code sequences A and B and the code sequences C and D are uncorrelated.

Here, the uncorrelation of the code sequences A and B and the code sequences C and D means that all elements of the sum of a correlation value (A#C) of the code sequence A and the code sequence C, and a correlation value (B#D) of the code sequence B and the code sequence D becomes zero.

The transmission code controller 210 alternately reads the code sequence A or B in each transmission period of the high frequency radar transmission signal. RX-RD1 with reference to the transmission code storage (complementary codes) 205. The transmission code controller 210 generates a transmission signal using the code sequence A or B read in each transmission period as a pulse compression signal, and outputs the generated transmission signal to the DAC 220 and the correlator 280, respectively.

The DAC 220 D/A-converts a digital transmission signal output from the transmission code controller 210 into an analog transmission signal, and outputs the converted transmission signal to the transmission RF section 230. The transmission RF section 230 converts the transmission signal that the DAC 220 output into the high frequency radar transmission signal TX-RD1 by using a local signal that a local signal oscillator output (not shown), and transmits the high frequency radar transmission signal TX-RD1 with the transmission antenna Antx-RD1.

The reception RF section 260 receives the radar transmission signal TX-RD1 reflected by the target TAR through the reception antenna Anrx-RD1, converts the high frequency reception signal received through the reception antenna Anrx-RD1 into a reception baseband signal using the local signal output from the local signal oscillator (not shown), and outputs the reception baseband signal to the ADC 270. The ADC 270 A/D-converts the analog reception baseband signal output from the reception RF section 260 into a digital reception baseband signal, and outputs the digital reception baseband signal to the correlator 280.

The correlator 280 calculates an autocorrelation value of the transmission signal generated by the transmission code controller 210 and the reception signal output from the ADC 270 in each transmission period, and outputs the result to the coherent adder 290. The coherent adder 290 adds the autocorrelation values calculated by the correlator 280 in the respective transmission periods corresponding to a predetermined number of coherent additions (for example, the number (two) of code sequences that form the complementary codes or the multiple of the number of code sequences), and measures the distance between the target TAR and the sector radar #RD1 based on the time when a peak autocorrelation value is obtained.

Since the radar system that includes the sector radar #RD1 shown in FIG. 3 and the sector radar #RD2 having the same configuration as that of the sector radar #RD1 shown in FIG. 3 uses the complementary codes as transmission codes, in a static environment (for example, when the target TAR does not move), the radar system Obtains the correlation characteristic to which the side lobe is suppressed by the addition results in the respective coherent adders of the respective sector radars #RD1 and #RD2.

However, in the radar system that includes the sector radars using the complementary codes shown in FIG. 3, when the phase rotation occurs in the reception signal according to fluctuation of the Doppler frequency (for example, when the target moves during measurement), it is difficult for the redar system to obtain the correlation characteristic in which the side lobe is suppressed by the addition results in the coherent adders of the respective sector radars #RD1 and #RD2.

Next, a configuration and an operation of the sector radar #RD1 in a case where the respective sector radars that form the radar system 100 shown in FIG. 1 have a configuration shown in FIG. 4 will be described. The sector radar #RD1 shown in FIG. 8 generates the transmission signal with any one code sequence among the complementary code sequences (A and B), but the sector radar #RD1 shown in FIG. 4 generates the transmission signal with one code sequence in each transmission period in the order of Spano code sequences (A, B, B', A', B, A, A', B') to be described later. Further, in the configuration and operation of the sector radar #RD1 shown in FIG. 4, description of the same content in the configuration and operation of the sector radar #RD1 shown in FIG. 3 will be omitted, and different content will be described.

The sector radar #RD1 shown in FIG. 4 includes a transmission code storage (Spano codes) 206, a transmission code controller 211, the DAC 220, the transmission RF section 230 to which the transmission antenna Anti-RD1 is connected, the reception RF section 260 to which the reception antenna Anrx-RD1 is connected, the ADC 270, the correlator 280, and the coherent adder 290.

The transmission code storage Spano codes) 206 stores 8 code sequences (A, B, B', A', B, A, A', B') that form the Spano code sequences configured based on the complementary codes (A and B), as code sequences used for generation of the radar transmission signal TX-RD1 by the sector radar #RD1.

The Spano code sequences refer to code sequences including code sequences A and B that form the complementary codes (A and B), order-inverted code sequences A' of the code sequences A, and order-inverted code sequences B' of the code sequences B. For example, the Spano code sequences include 8 code sequences that satisfy the order of (A, B, B', A', B, A, A', B'). Since the sector radar #RD1 shown in FIG. 4 generates the transmission signal with one code sequence in each transmission period in the order of the Spano code sequences (A, B, B', A', B, A, A', B'), even when the phase rotation occurs in the reception signal according to fluctuation of the Doppler frequency (for example, the target is moved during measurement), it is possible for the sector radar #RD1 to obtain the correlation characteristic in which the side lobe is suppressed (see FIG. 5).

A transmission code storage of the sector radar #RD2 (not shown) corresponding to the sector radar #RD1 shown in FIG. 4 stores Spano code sequences (C, D, C', D', D, C, C', D') configured based on the complementary codes (C and D), for example, as code sequences used for generation of the radar transmission signal TX-RD2 by the sector radar #RD2. The Spano code sequences (A, B, B', A', B, A, A', B') and the Spano code sequences (C, D, C', D', D, C, C', D') are uncorrelated.

Since the Spano code sequences are uncorrelated, a result obtained by adding all of correlation values of the n-th elements of the Spano code sequences becomes zero.

Specifically, the correlation value of the code sequence A and the code sequence C is represented as (A#C), when the Spano code sequences (A, B, B', A', B, A, A', B') and the Spano code sequences (C, D, C', D', C, C', D') are uncorrelated, the addition result of the correlation values of the respective elements of the same order satisfies the relationship of $$(A\#C)+(B\#D)+(B'\#C')+(A'\#D')+(B\#D)+(A\#C)+(A'\#C')+(B'\#D')=\text{zero vector}.$$

The transmission code controller 211 reads one code sequence in each transmission period in the order of the Spano code sequences (A, B, B', A', B, A, A', B'), in each transmission period of the high frequency radar transmission signal TX-RD1, with reference to the transmission code storage (Spano codes) 206. The transmission code controller 211 generates a transmission signal that is a pulse compression signal with one code sequence read in each transmission period, and outputs the generated transmission signal to the DAC 220 and the correlator 280, respectively.

The coherent adder 291 adds the autocorrelation values calculated by the correlator 280 in the respective transmission periods corresponding to a predetermined number of coherent additions (for example, 8 times that are numbers of the respective code sequences that form the Spano code sequences or the multiple), and measures the distance between the target TAR and the sector radar #RD1 based on the time when a peak autocorrelation value is obtained.

Here, a mechanism that the side lobe is suppressed in the coherent addition result will be described, even though the rotation phase occurs in the reception signal according to fluctuation of the Doppler frequency, when the transmission signal is generated using any one code sequence among the Spano code sequences (A, B, B', A', B, A, A', B') by the sector radar #RD1 shown in FIG. 4.

For example, the respective code sequences that form the complementary codes (A and B) are A=[+1, −1, −1, −1] and B=[+1, −1, +1, −1]. An autocorrelation value A#A of the code sequence A (a correlation operation value of the transmission signal generated by using the code sequence A, and baseband-processed reception signal that is a radar transmission signal reflected by the target TAR, where the radar transmission signal is a signal that converts the transmission signal into high frequency) becomes [4, 1, 0, −1]. Similarly, an autocorrelation value B#B of the code sequence B becomes [4, −1, 0, 1]. Here, A#A represents the autocorrelation value of the code sequence A. In the respective autocorrelation values, "4" represents a main lobe component.

In the respective autocorrelation values A#A and B#B, side lobe components are [1, 0, −1] and [−1, 0, 1], respectively. Here, the former is represented as a vector r and the latter is represented as a vector (−r). Further, a side lobe component of an autocorrelation value of the code sequence A' is represented as r', and a side lobe component of an autocorrelation value of the code sequence B' is represented as −r'.

For example, in the static environment, in the sector radar #RD1 shown in FIG. 3, whren the coherent adder 290 performs the coherent addition process for respective autocorrelation values over two transmission periods, the processing result becomes r+(−r)=0, and thus, the side lobe components become zero, that is, the side lobe is suppressed.

Similarly, in the sector radar #RD1 shown in FIG. 4, when the coherent adder 291 performs the coherent addition process for the respective autocorrelation values over 8 transmission periods, the processing result becomes r+(−r)+(−r')+r'+r+(−r)+r'+(−r')=0, and thus, the side lobe components become zero, that is, the side lobe is suppressed.

Then, when the target TAR is not under the static environment but moves, a Doppler phase rotation of φ occurs in the reception signal according to fluctuation of the Doppler frequency. The Doppler phase rotation amount φ is a small value of 1° to 2° or less, but when the number of coherent additions in the coherent adder 291 is large, for example, about 100, it is necessary to consider the influence of the Doppler phase rotation amount cumulatively applied to the reception signal. As the influence of the Doppler phase rotation amount φ, a coefficient exp ((n−1)jφ) is added to the reception signal when the Doppler phase rotation amount φ in the nth (n is an integer of 2 or greater) transmission period is applied.

For example, when the target TAR moves, in the sector radar #RD1 using the complementary codes shown in FIG. 3, the side lobe component of the autocorrelation value in the first transmission period is r, but the side lobe component of the autocorrelation value in the second transmission period becomes −rexp(jφ). Accordingly, when the coherent adder 290 performs the coherent addition process for the autocorrelation value over two transmission periods, the side lobe component does not become zero, but becomes r−rexp (jφ). Thus, the suppression of the side lobe is not sufficient, and the correlation characteristic of the reception signal deteriorates.

Similarly, in the sector radar #RD2 using the Spano codes shown in FIG. 4, the side lobe components of the respective autocorrelation values in the first to eighth transmission periods are r, r−exp(jφ), r−exp(2jφ), r−exp(3jφ), r−exp(4jφ), r−exp(5jφ), r−exp(6jφ) and r−exp(7jφ). Here, in the coherent adder 291, the addition process result of the side lobe components of the autocorrelation values in the first, second, fifth and sixth transmission periods is expressed by Expression (1).

[Expression 1]

$$r\{1-\exp(j\phi)-\exp(4j\phi)+\exp(5j\phi)\} \quad (1)$$

The expression (1) is the sum of $\{1-\exp(j\phi)\}$ and $\{-\exp(4j\phi)+\exp(5j\phi)\}$. Since the Doppler phase rotation amount φ is minute, $\{1-\exp(j\phi)\}$ and $\{-\exp(4j\phi)+\exp(5j\phi)\}$ can be approximated as vectors having opposite directions and the same size (see FIG. 5(A)). Accordingly, Expression (1) can be approximated to be zero.

Similarly, in the coherent adder 291, the addition result of the side lobe components of the autocorrelation values in the third, fourth, seventh and eighth transmission periods is expressed by Expression (2).

[Expression 2]

$$r\{-\exp(2j\phi)+\exp(3j\phi)+\exp(6j\phi)-\exp(7j\phi)\} \quad (2)$$

The expression (2) is the sum of $\{-\exp(2j\phi)+\exp(3j\phi)\}$ and $\{\exp(6j\phi)-\exp(7j\phi)\}$. Since the Doppler phase rotation amount φ is minute, $\{-\exp(2j\phi)+\exp(3j\phi)\}$ and $\{\exp(6j\phi)-\exp(7j\phi)\}$ can be approximated as vectors having opposite directions and the same size (see FIG. 5(B)). Accordingly, Expression (2) can be approximated to be zero.

Accordingly, in the sector radar #RD1 shown in FIG. 4, when the coherent adder 291 performs the coherent addition process for the respective autocorrelation values over 8 transmission periods corresponding to the number of Spano code sequences, since the side lobe components shown in Expressions (1) and (2) can be approximated to be zero, the side lobes are suppressed, and thus, the correlation characteristic of the reception signal does not deteriorate due to the characteristic of the Spano code sequences.

As described above, for example, even when the target TAR is not under the static environment but moves, when the sector radar #RD1 generates the transmission signal using the Spano code sequences, and the respective autocorrelation values are added over 8 transmission periods corresponding to the number of Spano code sequences or transmission periods of a multiple of 8, the correlation characteristic of the reception signal does not deteriorate.

In the above description, when the target TAR moves, the correlation characteristic of the reception signal does not deteriorate. However, for example, when the sector radar #RD2 receives the reflected wave signal obtained as the radar transmission signal output from the sector radar #RD1 is reflected by the target, a technical countermeasure is not considered for a generated interference.

Thus, in the following embodiments, an example of a radar system that suppresses deterioration of the correlation characteristic of the reception signals, and suppresses interference between plural sector radars even when the phase rotation Occurs in the reception signal according to fluctuation of the Doppler frequency will be described.

(First Embodiment)

Next, an embodiment of a radar system according to the present disclosure will be described with reference to the accompanying drawings. The radar system 100 of the present embodiment includes the sector radar #RD1 and the sector radar #RD2 as plural (for example, two) sector radars (see FIG. 1), for example, and measures the distances between the target TAR and the respective sector radars #RD1 and #RD2.

Figure 6:
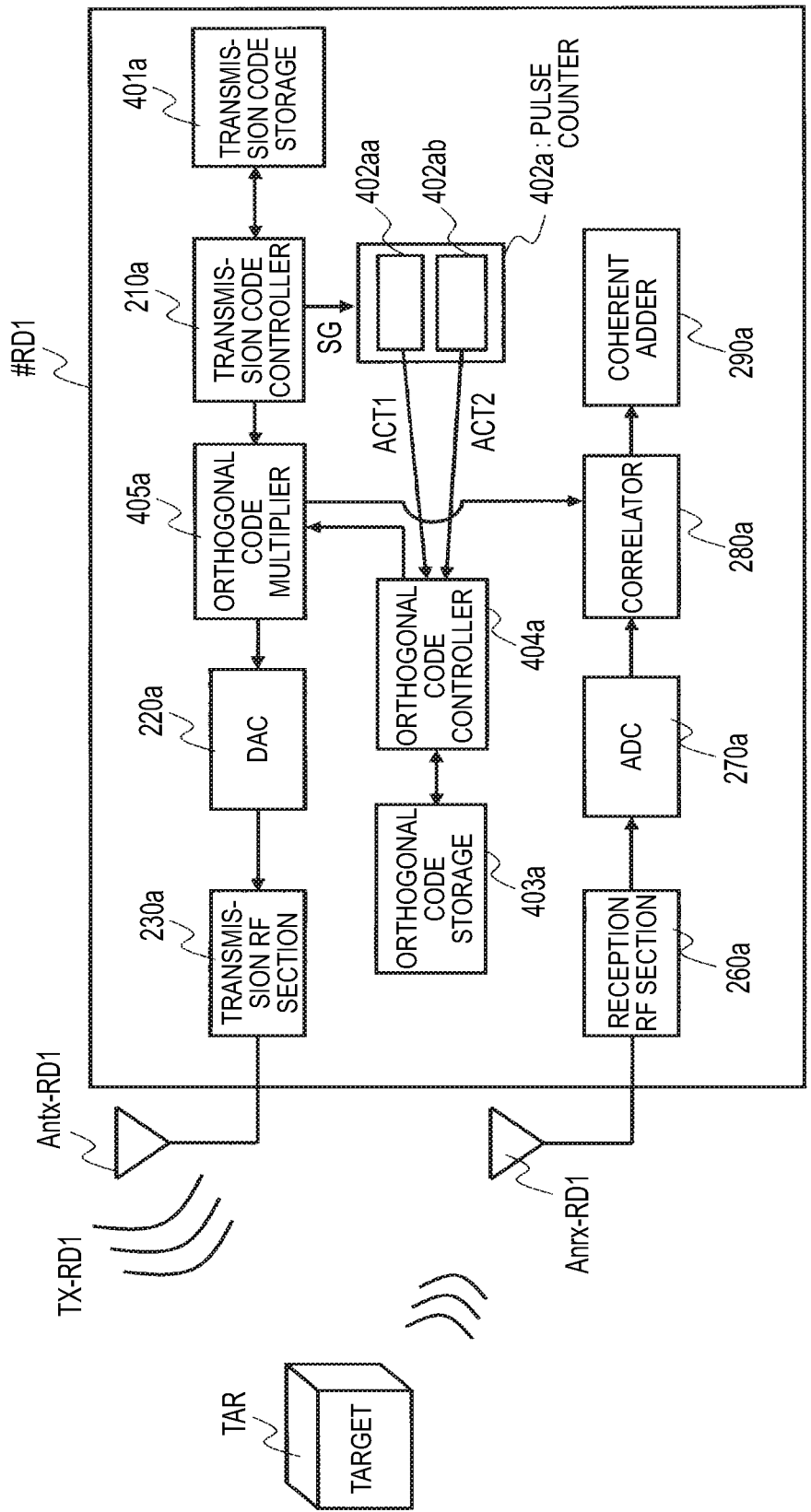
FIG. 6 is a block diagram illustrating an internal configuration of the sector radar #RD1 that forms a radar system of a first embodiment and a second embodiment.
Figure 7:
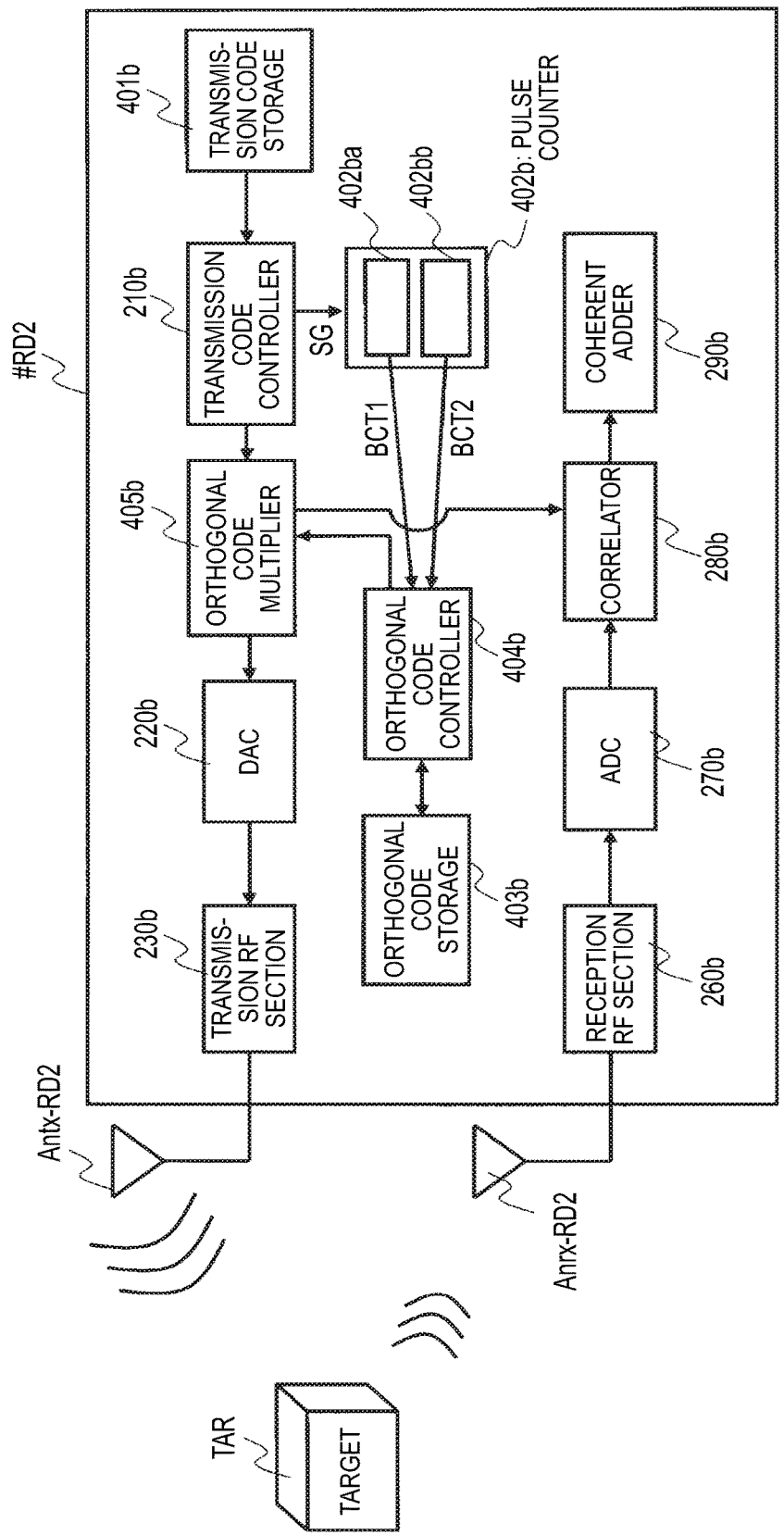
FIG. 7 is a block diagram illustrating an internal configuration of the sector radar #RD2 that forms the radar system of the first embodiment and the second embodiment.

FIG. 6 is a block diagram illustrating an internal configuration of the sector radar #RD1 that forms the radar system 100 of the first and second embodiments. FIG. 7 is a block diagram illustrating an internal configuration of the sector radar #RD2 that forms the radar system 100 of the first and second embodiments. The respective sector radars #RD1 and #RD2 are operated in a similar way. In the present embodiment, the sector radar #RD1 is described as an example, and with respect to the operation of the sector radar #RD2, the description of the same content as that of the sector radar #RD1 will not be repeated, and content different from that of the sector radar #RD1 will be described.

In the present embodiment, the sector radar #RD1 selects one Spano code and one first orthogonal code respectively, in a predetermined order in each transmission period of the radar transmission signal TX-RD1, from $2^{(n+1)}$ Spano codes (n is an integer of 1 or greater), specifically, 8 Spano code sequences (A, B, B', A', B, A, A', B') and a first orthogonal code sequence (to be described later), and multiplies the selected codes to generate a first transmission signal.

Further, in the present embodiment, the sector radar #RD2 selects one Spano code and one second orthogonal code respectively, in the predetermined order in each transmission period of the radar transmission signal TX-RD2, from 8 Spano code sequences (C, D, D', C', D, C, C', D') and a second orthogonal code sequence (to be described later), and multiplies the selected codes to generate a second transmission signal.

In addition, in the present embodiment, a total of 8 first orthogonal code sequences and 8 second orthogonal code sequences are orthogonal to each other over 16 transmission periods of which the number is two times 8 (see expression (3)). Further, the Spano code sequences (A, B, B', A', B, A, A', B') and the Spano code sequences (C, D, D', C', D, C, C', D') are uncorrelated.

Further, in the present embodiment, the respective sector radars #RD1 and #RD2 generate the first transmission signal and the second transmission signal using the 8 uncorrelated Spano code sequences. Thus, due to the above-described characteristic of the Spano code sequences, in the radar system 100 of the present embodiment, even in the static environment or a situation where the phase rotation occurs in the reception signal according to fluctuation of the Doppler frequency since the target moves, it is possible for the sector radars #RD1 and #RD2 to suppress the correlation characteristic of the reception signals.

The sector radar #RD1 shown in FIG. 6 includes a transmission code storage 401a, a transmission code controller 210a, a pulse counter 402a, an orthogonal code storage 403a, an orthogonal code controller 404a, an orthogonal code multiplier 405a, a DAC 220a, a transmission RF section 230a to which a transmission antenna AntX-RD1 is connected, a reception RF section 260a to which a reception antenna Anrx-RD1 is connected, an ADC 270a, a correlator 280a, and a coherent adder 290a. The pulse counter 402a includes two pulse counters 402aa and 402ab.

The sector radar #RD2 shown in FIG. 7 includes a transmission code storage 401b, a transmission code controller 210b, a pulse counter 402b, an orthogonal code storage 403b, an orthogonal code controller 404b, an orthogonal code multiplier 405b, a DAC 220b, a transmission RF section 230b to which a transmission antenna AntX-RD2 is connected, a reception RF section 260b to which a reception antenna Anrx-RD2 is connected, an ADC 270b, correlator 280b, and a coherent adder 290b. The pulse counter 402b includes two pulse counters 402ba and 402bb.

The transmission code storage 401a stores four code sequences (A, B, A', B') that form the Spano code sequences (A, B, B', A', B, A, A', B'), for example, as code sequences used for generation of the radar transmission signal TX-RD1 by the sector radar #RD1.

The transmission code storage 401b stores four code sequences (C, D, C', D') that form the Spano code sequences (C, D, D', C', D, C, C', D'), for example, as code sequences used for generation of the radar transmission signal TX-RD2 by the sector radar #RD2.

The transmission code controller 210a outputs a transmission signal generation timing signal SG to the pulse counter 402a (specifically, two pulse counters 402aa and 402ab) in each transmission period of the radar transmission signal TX-RD1.

The transmission code controller 210a reads any one code sequence among the Spano code sequences (A, B, B', A', B, A, A', B') according to the transmission signal generation timing signal SG in each transmission period of the radar transmission signal TX-RD1, in the order of the Spano code sequences (A, B, B', A', B, A, A', B') from the transmission code storage 401a, and outputs the read code sequence to the orthogonal code multiplier 405a.

The pulse counter 402aa increments a counter value ACT1 based on the generation timing signal SG from the transmission code controller 210a, and outputs the incremented counter value to the orthogonal code controller 404a. The counter value ACT1 repeats an integer value of 1 to 8, returns to 1 after 8, and corresponds to the transmission period of the radar transmission signal TX-RD1 one to one. For example, in FIG. 8, the counter value ACT1 becomes 1 in the first (leftmost side) radar transmission signal TX-RD1 transmission period, becomes 8 in the eighth radar transmission signal TX-RD1 transmission period, and becomes 1 in the ninth radar transmission signal TX-RD1 transmission period.

When the generation timing signal SG from the transmission code controller 210a is input eight times, the pulse counter 402ab increments a counter value ACT2, and outputs the incremented counter value to the orthogonal code controller 404a. The counter value ACT2 alternately repeats a value of 1 and 2, and corresponds to 8 transmission periods of the radar transmission signal TX-RD1 one to one. For example, in FIG. 8, the counter value ACT2 becomes 1 in the first to eighth radar transmission signal TX-RD1 transmission periods, becomes 2 in the ninth to sixteenth radar transmission signal TX-RD1 transmission periods, and becomes 1 again in the seventeenth to twenty fourth radar transmission signal TX-RD1 transmission periods.

The orthogonal code storage 403a stores first orthogonal code sequences OC1a and OC1b orthogonal to second orthogonal code sequences OC2a and OC2b in the sector radar #RD2 over the transmission periods of the radar transmission signal TX-RD1 of which the number is two times 8 (=2×(3+1)=$2^{2+1}$), for example. That is, the first orthogonal code sequences OC1a and OC1b and the second orthogonal code sequences OC2a and OC2b satisfy the relationship of the following Expression (3), and the sum of inner products becomes a zero vector OC1a·OC2b represents the inner product of vectors. In the present embodiment, the first orthogonal code sequences OC1a and OC1b are vectors having a length of 8. For example, the first orthogonal code sequences OC1a and OC1b are OC1a=[1, 1, 1, 1, 1, 1, 1, 1] and OC1a=[1, 1, 1, 1, 1, 1, 1, 1] (see FIG. 8).

The orthogonal code storage 403b stores the second orthogonal code sequences OC2a and OC2b orthogonal to the first orthogonal code sequences OC1a and OC1b in the sector radar #RD1 over the transmission periods of the radar transmission signal TX-RD2 of which the number is two times 8 (=$2^{2+1}$), for example. In the present embodiment, the second orthogonal code sequences OC2a and OC2b are vectors having a length of 8. For example, the second orthogonal code sequences OC2a and OC2b are OC2a=[1, 1, 1, 1, 1, 1, 1, 1] and OC2a=[−1, −1, −1, −1, −1, −1, −1, −1] (see FIG. 8).

[Expression 3]

$$\vec{OC}1a \cdot \vec{OC}2a + \vec{OC}1b \cdot \vec{OC}2b = \vec{0} \qquad (3)$$

Here, $\vec{OC}1a$ represents a vector OC1a.

The orthogonal code controller 404a reads the first orthogonal code sequences from the orthogonal code storage 403a according to the counter values ACT1 and ACT2 from the pulse counters 402aa and 402ab, and outputs the read first orthogonal code sequences to the orthogonal code multiplier 405a. For example, the orthogonal code controller 404a reads a first orthogonal code "1" from the orthogonal code storage 403a when the counter value ACT1 is "1" and the counter value ACT2 is "1", and reads a first orthogonal code "1" from the orthogonal code storage 403a when the counter value ACT1 is "1" and the counter value ACT2 is "2" (see FIG. 8).

The orthogonal code controller 404b reads the second orthogonal code sequences from the orthogonal code storage 403b according to counter values BCT1 and BCT2 from the pulse counters 402ba and 402bb, and outputs the read second orthogonal code sequences to the orthogonal code multiplier 405b. For example, the orthogonal code controller 404b reads a second orthogonal code "1" from the orthogonal code storage 403b when the counter value BCT1 is "1" and the counter value BCT2 is "1", and reads a second orthogonal code "−1" from the orthogonal code storage 403b when the counter value BCT1 is "1" and the counter value ACT2 is "2" (see FIG. 8).

The orthogonal code multiplier 405a multiplies the code sequence output from the transmission code controller 210a and the first orthogonal code output from the orthogonal code controller 404a to generate the first transmission signal. The orthogonal code multiplier 405a outputs the generated first transmission signal to the DAC 220a and the correlator 280a, respectively. In the present embodiment, the orthogonal code multiplier 405a generates the first transmission signals of A, B, B', A', B, A, A', B', A, B, B', A', B, A, A', B', in 16 total transmission periods, which are two times 8 which is the same number as the Spano code sequences (A, B, B', A', B, A, A', B') (see FIG. 8).

The orthogonal code multiplier 405b multiplies the code sequence output from the transmission code controller 210b and the second orthogonal code output from the orthogonal code controller 404b to generate the second transmission signal. The orthogonal code multiplier 405b outputs the generated second transmission signal to the DAC 220b and the correlator 280b, respectively. In the present embodiment, the orthogonal code multiplier 405b generates the second transmission signals of C, D, D', C', D, C, C', D', −C, −D', −C', −D, −C, −C', −D', in 16 total transmission periods, which are two times 8 which is the same number as the Spano code sequences (C, D, D', C', D, C, C', D') (see FIG. 8). Since 8 second transmission signals that are the second half of the second transmission signals are multiplied by the orthogonal code sequence OC2b, a sign of "−" is given.

Further, even when any one code sequence among the Spano code sequences is multiplied by the first orthogonal code or the second orthogonal code (for example, "−1") having the negative sign, it is possible to suppress the correlation characteristic of the reception signals in the respective sector radars #RD1 and #RD2. This is similarly applied to the respective embodiments described later.

The reason is as follows. For example, when a reflected wave signal as a radar transmission signal generated using "−A" reflected by a target TAR is received, since a correlation operation has a linear operation characteristic. Thus, an autocorrelation value becomes (−A)#(−A)=A#A, in which a negative component is canceled.

The DAC 220a D/A-converts a digital transmission signal output from the orthogonal code multiplier 405a into an analog transmission signal, and outputs the converted analog transmission signal to the transmission RF section 230a. The transmission RF section 230a converts the analog transmission signal output from the DAC 220a into a high frequency radar transmission signal TX-RD1 using a local signal output from a local signal oscillator (not shown), and transmits the high frequency radar transmission signal TX-RD1 with the transmission antenna Antx-RD1.

Figure 8:
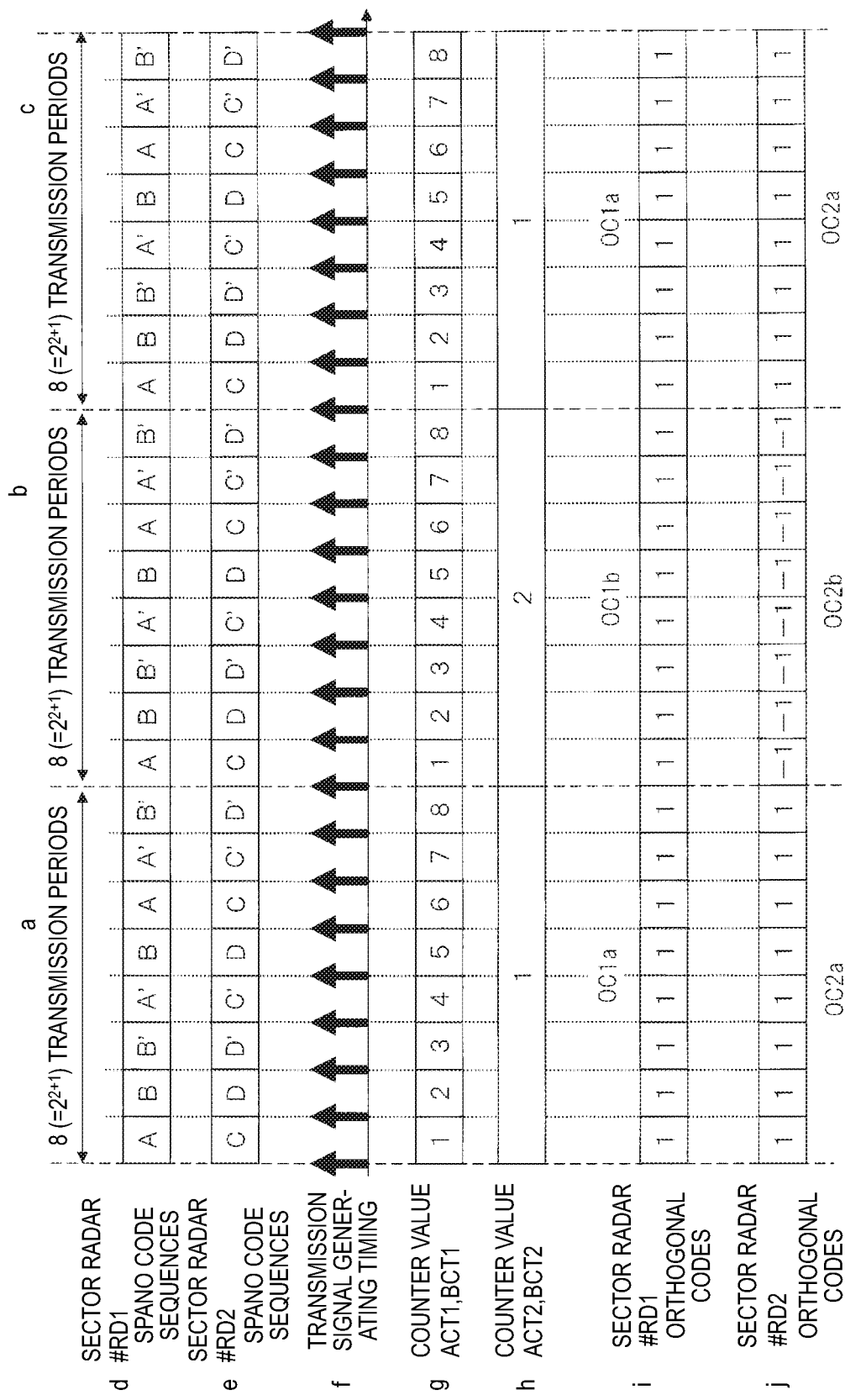
FIG. 8 is a diagram illustrating an example of the relationship between Spano code sequences, pulse timings, respective counter values, and orthogonal codes used in each sector radar.

In the present embodiment, timings of the multiplication of the code sequences and the orthogonal codes in the respective sector radars #RD1 and #RD2 are synchronized between the respective sector radars #RD1 and #RD2, as shown in FIG. 8, for example. Namely, the transmission code controllers 210a and 210b of the respective sector radars #RD1 and #RD2 control the timings of multiplication so that the orthogonal codes are synchronized between the respective sector radars #RD1 and #RD2.

On the other hand, timings of transmission pulses transmitted by the respective sector radars #RD1 and #RD2 may not be exactly the same. For example, the respective sector radars #RD1 and #RD2 may alternately shift the timings of the transmission pulses in the respective sector radars #RD1 and #RD2 by about several tens of nanoseconds so that the transmission pulses are not transmitted at the same time. An offset value (shift value) of the transmission timings between the respective sector radars #RD1 and #RD2 may be zero, or may be about several tens of nanoseconds corresponding to the transmission period of the transmission pulse. When the offset value is a value smaller than the transmission period, in the radar system 100 of the present embodiment, the respective sector radars #RD1 and #RD2 are capable of suppressing the interference signal component.

The reception RF section 260a receives the radar transmission signal TX-RD1 reflected by the target TAR through the reception antenna Anrx-RD1, converts the high frequency reception signal received through the reception antenna Anrx-RD1 into a reception baseband signal using a local signal output from the local signal oscillator (not shown), and outputs the reception baseband signal to the ADC 270a. The ADC 270a A/D-converts the analog reception baseband signal output from the reception RF section 260a into a digital reception baseband signal, and outputs the digital reception baseband signal to the correlator 280a.

The correlator 280a calculates an autocorrelation value of the transmission signal generated by the orthogonal code multiplier 405a and the reception signal output from the ADC 270a in each transmission period, and outputs the result to the coherent adder 290a. The coherent adder 290a adds the autocorrelation values calculated by the correlator 280a in the respective sixteen total transmission periods corresponding to a predetermined number of coherent additions (for example, two times the number (two) of Spano code sequences), and measures the distance between the target TAR and the sector radar #RD1 based on the time when a peak autocorrelation value is obtained.

For example, when the reflected wave signal obtained as the radar transmission signal TX-RD1 transmitted from the sector radar #RD1 reflected by the target TAR is received in the sector radar #RD2, an interference component of the reception signal in the sector radar #RD2 is (A#C)+(B#D)+(B'#D')+(A'#C')+(B#D)+(A#C)+(A'#C')+(B'#D')+(A#−C)+(B#−D)+(B'#−D')+(A'#C')+(B#−D)+(A#−C)+(A'#−C')+(B'#−D'), as a result of the addition process of the coherent adder 290b.

Here, the correlation operation between the code sequence A and the code sequence B is represented as (A#B).

In the code sequence A=[A1, A2, . . . AL] and the code sequence B=[B1, B2, . . . BL], the following Expression (4) is obtained.

[Expression 4]

$$A\#B = \left[\sum_{k=1}^{L}(Ak \cdot Bk), \sum_{k=2}^{L}(Ak \cdot Bk-1), \sim, \sum_{k=L}^{L} Ak \cdot Bk-(L-1)\right] \quad (4)$$

Since the correlation operation is a linear operation, in the correlation operation, it is possible to remove the negative sign from the correlation operation. For example, since (A#−C) can be modified as −(A#C), the interference component in the sector radar #RD2 becomes (A#C)+(B#D)+(B'#D')+(A'#C')+(B#D)+(A#C)+(A'#C')+(B'#D')−(A#C)−(B#D)−(B'#D')−(A'#C')−(B#D)−(A#C)−(A'#C')−(B'#D')=0 (zero).

Further, for example, even when the reflected wave signal obtained as the radar transmission signal TX-RD2 transmitted from the sector radar #RD2 reflected by the target TAR is received in the sector radar #RD1, an interference component of the reception signal in the sector radar #RD1 becomes zero by the same operation. Accordingly, in the present embodiment, the interference in the respective radars #RD1 and #RD2 does not occur.

As described above, in the radar system 100 of the present embodiment, the sector radar #RD1 generates the first transmission signal by multiplying any one Spano code and the first orthogonal code in the predetermined order in each transmission period of the radar transmission signal TX-RD1 from 8 Spano code sequences (A, B, B', A', B, A, A', B') and the first orthogonal code sequence, for example.

The sector radar #RD2 generates the second transmission signal by multiplying any one Spano code and the second orthogonal code in the predetermined order in each transmission period of the radar transmission signal TX-RD2 from 8 Spano code sequences (C, D, D', C', D, C, C', D') and the second orthogonal code sequence, for example. All 8 of the first orthogonal code sequences and the second orthogonal code sequences are orthogonal to each other over sixteen transmission periods which are two times 8.

Further, the respective sector radars #RD1 and #RD2 add the correlation values calculated by the correlator 280a in the respective sixteen total transmission periods corresponding to the predetermined number of coherent additions (for example, two times the number (two) of the Spano code sequences) in the respective coherent adders 290a and 290b.

Thus, in the radar system 100 of the present embodiment, even when the radar transmission signal TX-RD2 transmitted from the sector radar #RD2 and the radar transmission signal TX-RD1 transmitted from the sector radar #RD1 are received in the sector radars #RD1 and #RD2, the interference component of the reception signal in the respective sector radars #RD1 and #RD2 becomes zero, and thus, the respective sector radars #RD1 and #RD2 is possible to suppress the interference.

That is, even when the phase rotation occurs in the reception signal according to fluctuation of the Doppler frequency, the radar system 100 of the present embodiment is capable of suppressing deterioration of the correlation characteristic of the reception signals, and is capable of suppressing the interference between the plural sector radars.

When the code sequences A and B and the code sequences C and D are uncorrelated, the radar system 100 is capable of most effectively suppressing the interference wave, but even when the code sequences A and B and the code sequences C and D are not uncorrelated, by multiplying the code sequences A and B, and the code sequences C and D by the orthogonal code sequence, the radar system 100 is capable of suppressing the interference wave.

(Modification Examples of the First Orthogonal Code Sequences and the Second Orthogonal Code Sequences in the First Embodiment)

In the above-described embodiment, the first orthogonal code sequences OC1a and OC1b, and the second orthogonal code sequences OC2a and OC2b are as follows:

OC1a=[1, 1, 1, 1, 1, 1, 1, 1],
OC1b=[1, 1, 1, 1, 1, 1, 1, 1],
OC2a=[1, 1, 1, 1, 1, 1, 1, 1], and
OC2b=[−1, −1, −1, −1, −1, −1, −1, −1]. However, when the above-mentioned expression (3) is satisfied, the following examples may be used.

OC1a=[1, −1, 1, −1, 1, −1, 1, −1],
OC1b=[−1, 1, −1, 1, −1, 1, −1, 1],
OC2a=[1, −1, 1, −1, 1, −1, 1, −1], and
OC2b=[1, −1, 1, −1, 1, −1, 1, −1],
or
OC1a=[1, 1, 1, 1, 1, 1, 1, 1],
OC1b=[−1, 1, −1, 1, −1, 1, −1, 1],
OC2a=[1, −1, 1, −1, 1, −1, 1, −1], and
OC2b=[1, 1, 1, 1, 1, 1, 1, 1].

In the present embodiment, as an example of the Spano codes, a set of Spano codes including 8 sequences of (A, B, B', A', B, A, A', B') is used, the Spano codes that form one set by the 8 sequences are considered as one group, and then, the orthogonal code is multiplied to the one set of the Spano codes.

Further, the Spano codes that form one set of the 8 sequences may be separated into the first half of four sequences (A, B, B', A') and the second half of four sequences (B, A, A', B') the separated Spano codes is considered that there are two sets of four-sequence Spano codes, and the orthogonal code may be multiplied to the two sets of four-sequence Spano codes.

In the first half of four sequences or the second half of four sequences, the above-described characteristic of the Spano codes that forms one set of the 8 sequences is not present, but by multiplying the orthogonal code using the first half of four sequences, and then, by multiplying the orthogonal code using the second half of four sequences, the radar system 100 is capable of obtaining the suppression effect of the interference signal component and the side lobe suppression characteristic, in a similar way to the multiplication of the orthogonal code for the above-described Spano codes that form one set of the 8 sequences.

For example, the sector radar #RD1 uses the codes (A, B, B', A') and the codes (B, A, A', B') obtained by dividing the Spano codes that form one set by the 8 sequences used in the present embodiment into the first half of four sequences and the second half of four sequences. Similarly, the sector radar #RD2 uses codes (C, D, D', C') and codes (D, C, C', D') that are divided in a similar way.

Here, when the sector radar #RD1 uses the orthogonal codes of (1, 1), and the sector radar #RD2 uses the orthogonal codes of (1, −1), transmission pulses of (A, B, B', A'), (A, B, B', A'), (B, A, A', B'), and (B, A, A', B') are transmitted from the sector radar #RD1. On the other hand, transmission pulses of (C, D, D', C'), (−C, −D, −D', −C'), (D, C, C', D'), and (−D, −C, −C', −D') are transmitted from the sector radar #RD2.

(Modification Example of the First Embodiment)

Further, in the present embodiment, by using the phase rotation, a radar system is capable of reducing an error of the transmitted high frequency signal or the received high frequency signal. For example, in the phase rotation in transmission, whenever two transmission pulses are transmitted, a phase rotation of 90 degrees is given to the transmission pulses. Further, in the phase rotation in reception, whenever two transmission pulses are transmitted, a phase rotation of −90 degrees is given to the reception pulses in association with two transmission pulses.

Figure 18:
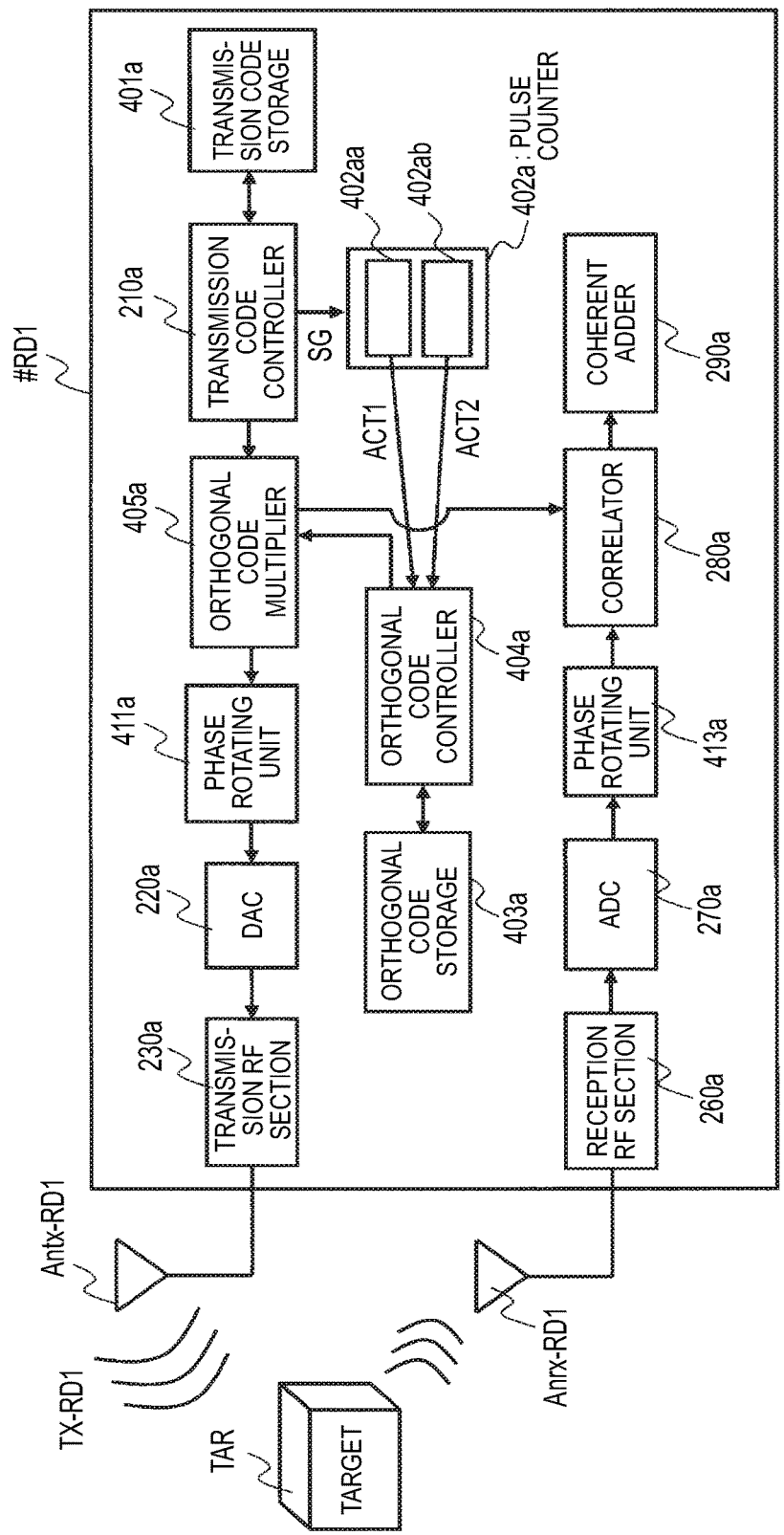
FIG. 18 is a block diagram illustrating an internal configuration of a sector radar #RD1 that forms a radar system of a modification example of the first embodiment.
Figure 19:
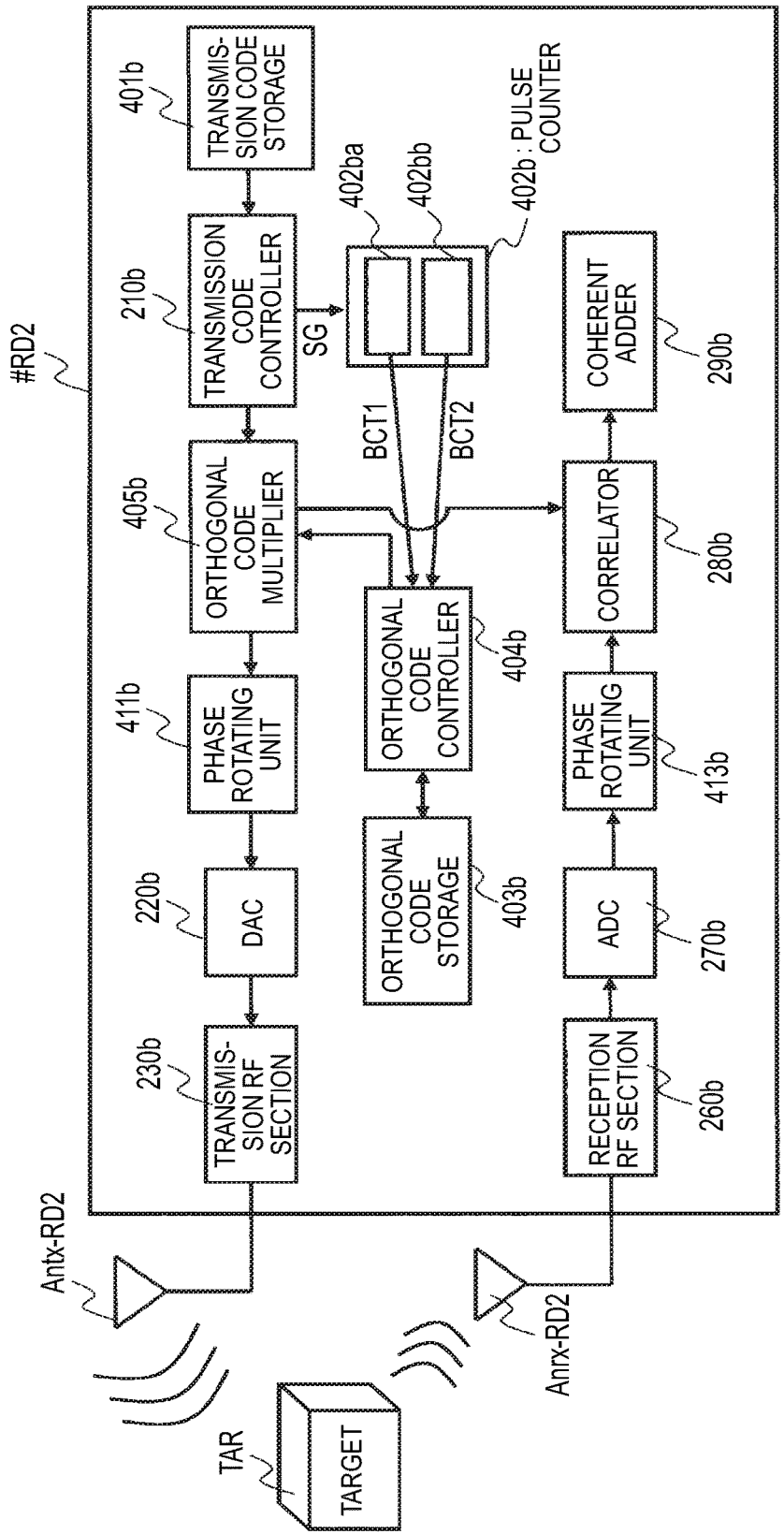
FIG. 19 is a block diagram illustrating an internal configuration of a sector radar #RD2 that forms the radar system of the modification example of the first embodiment.

A more specific configuration will be described with reference to FIGS. 18 and 19. FIG. 18 is a block diagram illustrating an internal configuration of the sector radar #RD1 that forms a radar system of a modification example of the first embodiment. FIG. 19 is a block diagram illustrating an internal configuration of the sector radar #RD2 that forms the radar system of the modification example of the first embodiment.

In the sector radar #RD1 shown in FIG. 18, a phase rotating unit 411a is provided in a front stage of the DAC 220a, and a phase rotating unit 413a is provided in a rear stage of the ADC 270a. Similarly, in the sector radar #RD2 shown in FIG. 19, a phase rotating unit 411b is provided in a front stage of the DAC 220b, and a phase rotating unit 413b is provided in a rear stage of the ADC 270b.

In the phase rotating units 411a and 411b, a phase rotation of 90 degrees is given to outputs of the orthogonal code multipliers 405a and 405b whenever two transmission pulses are transmitted. In the phase rotating units 413a and 413b, a phase rotation of −90 degrees is given to outputs of the ADCs 270a and 270b whenever two reception pulses are received.

In the orthogonal code multipliers 405a and 405b, the orthogonal codes of the respective sector radars #RD1 and #RD2 shown in FIG. 8 are multiplied with respect to the outputs of the transmission code controllers 210a and 210b. Thus, transmission code sequences generated by the orthogonal code multiplier 405a of the sector radar #RD1 are as follows:

A, B, B', A', B, A, A', B,
A, B, B', A', B, A, A', B,
...

On the other hand, transmission code sequences generated by the orthogonal code multiplier 405b of the sector radar #RD2 are as follows:
C, D, D', C', D, C, C', D',
C, D, D', C', D, C, C', D'
...

The phase rotating units 411a and 411b specify the phase rotation of 90 degrees whenever transmitting two transmission pulses. In this case, transmission signals transmitted from the sector radar #RD1 are as follows:
A, B, jB', jA', −B, −A, −jA', −jB',
A, B, jB', jA', −B, −A, −jA', −jB',
...

On the other hand, transmission signals transmitted from the sector radar #RD2 are as follows:
C, D, jD', jC', −D, −C, −jC', −jD',
C, D, jD', jC', −D, −C, −jC', −jD',
...

Next, after the above-described transmission signals are received, in the phase rotating units 413a and 413b, whenever two reception pulses are received, a reverse phase of the phase rotation amount given in the phase rotating units 411a and 411b, that is, the phase rotation of −90 degrees is given. In this case, reception signals received in the sector radar #RD1 are as follows:
A, B, B', A', B, A, A', B',
A, B, B', A', B, A, A', B',
...

On the other hand, reception signals received in the sector radar #RD2 are as follows:
C, D, D', C', D, C, C', D',
C, D, D', C', D, C, C', D',
...

As described above, in the respective sector radars #RD1 and #RD2, when the phase rotating units 411a and 411b are provided in the front stages of the DACs 220a and 220b and the phase rotating units 413a and 413b are provided in the rear stages of the ADCs 270a and 270b, the same effects as in the respective sector radars #RD1 and #RD2 of the radar system 100 of the first embodiment can also be obtained.

(Second Embodiment)

As Spano code sequences having a property that the correlation characteristic of the reception signals does not deteriorate even when the phase rotation is generated in the reception signals according to fluctuation of the Doppler frequency, for example, four code sequences (A, B, B, A) are known, in addition to 8 code sequences (A, B, B', A', B, A, A', B') in the first embodiment.

In the second embodiment, the sector radar #RD1 generates the first transmission signal using any one code sequence among four Spano code sequences (A, B, B, A), and any one code sequence having a length of 1 among four first orthogonal code sequences OC1a and OC1b (having a length of 4) in each transmission period. Further, the sector radar #RD2 generates the second transmission signal using any one code sequence among four Spano code sequences (C, D, D, C), and any one code sequence having a length of 1 among four second orthogonal code sequences OC2a and OC2b (having a length of 4) in each transmission period.

Since a configuration of a radar system of the present embodiment is the same as that of the radar system 100 of the first embodiment, the same reference signs are used, and hereinafter, content different from that of the radar system 100 of the first embodiment will be described.

The transmission code storage 401a stores two code sequences (A and B) that form the Spano code sequences (A, B, B, A), for example, as code sequences used for generation of the radar transmission signal TX-RD1 by the sector radar #RD1.

The transmission code storage 401b stores two code sequences (C and D) that form the Spano code sequences (C, D, D, C), for example, as code sequences used for generation of the radar transmission signal TX-RD2 by the sector radar #RD2.

The pulse counter 402aa increments the counter value ACT1 based on the generation timing signal SG from the transmission code controller 210a, and outputs the incremented counter value to the orthogonal code controller 404a. In the present embodiment, the counter value ACT1 repeats an integer value of 1 to 4, returns to 1 after 4, and corresponds to the transmission period of the radar transmission signal TX-RD1 one-to-one. For example, the counter value ACT1 becomes 1 in the first radar transmission signal TX-RD1 transmission period, becomes 4 in the fourth radar transmission signal TX-RD1 transmission period, and becomes 1 in the fifth radar transmission signal TX-RD1 transmission period.

The pulse counter 402ab increments the counter value ACT2 when the generation timing signal SG from the transmission code controller 210a is input four times, and outputs the incremented counter value to the orthogonal code controller 404a. For example, the counter value ACT2 becomes 1 in the first to fourth radar transmission signal TX-RD1 transmission periods, becomes 2 in the fifth to eighth radar transmission signal TX-RD1 transmission periods, and becomes 1 again in the ninth to twelfth radar transmission signal TX-RD1 transmission periods.

The orthogonal code storage 403a stores the first orthogonal code sequences OC1a and OC1b orthogonal to the second orthogonal code sequences OC2a and OC2b in the sector radar #RD2 over the transmission periods of the radar transmission signal TX-RD1 of which the number is two times 4 ($=2^{1+1}$), for example. In the present embodiment, the first orthogonal code sequences OC1a and OC1b are vectors having a length of 4, and for example, are as follows:
OC1a=[1, −1, 1, −1], and
OC1b=[−1, 1, −1, 1].

The orthogonal code storage 403b stores the second orthogonal code sequences OC2a and OC2b orthogonal to the first orthogonal code sequences OC1a and OC1b in the sector radar #RD1 over the transmission periods of the radar transmission signal TX-RD2 of which the number is two times 4 ($=2^{1+1}$), for example in the present embodiment, the second orthogonal code sequences OC2a and OC2a are vectors having a length of 4, and for example, are as follows:
OC2a=[1, −1, 1, −1], and
OC2b=[1, −1, 1, −1].

The orthogonal code multiplier 405a repeats a sequential reading of the Spano code sequences twice in the 8 total transmission periods of which the number is two times 4, which is the same number as the Spano code sequences (A, B, B, A), in each transmission period, and performs a sequential reading of the first orthogonal code sequence OC1a, and then, performs a sequential reading of the first orthogonal code sequence OC1b. Thus, each first transmission signal of A, −B, B, −A, −A, B, −B, A is generated.

The orthogonal code multiplier 405b generates each second transmission signal of C, −D, D, −C, C, −D, D, −C, in the 8 total transmission periods of which the number is two times 4, which is the same number as the Spano code sequences (C, D, D, C).

For example, it is assumed that the radar transmission signal. TX-RD1 transmitted from the sector radar #RD1 and the radar transmission signal TX-RD2 transmitted from the sector radar #RD2 are received in the sector radars #RD2. An interference component of the reception signal in the sector radar #RD2 becomes, for example, by deforming (A#−C) to −(A#C), (A#−C)=−(A#C), and (−B#−D)=(B#D), as a result of the addition process of the coherent adder 290*b*, (A#C)+(−B#−D)+(B#D)+(−A#−C)+(−A#C)+(B#C)+(−B#D)+(A#−C)=(A#C)+(B#D)+(B#D)+(A#C)−(A#C)+(B#C)−(B#D)−(A#C)=0 (zero).

Further, for example, when the reflected wave signal obtained as the radar transmission signal TX-RD2 transmitted from the sector radar #RD2 reflected by the target TAR is received in the sector radar #RD1, interference component of the reception signal in the sector radar #RD1 also becomes zero by the same operation. Accordingly, in the present embodiment, the interference in the respective sector radars #RD1 and #RD2 does not occur.

As described above, in the radar system 100 of the present embodiment, similarly, the sector radar #RD1 generates the first transmission signal using any one code sequence among four Spano code sequences (A, B, B, A), and any one code sequence having the length of 1 among four first orthogonal code sequences OC1*a* and OC1*b* (having the length of 4) in each transmission period. Further, the sector radar #RD2 generates the second transmission signal using any one code sequence among four Spano code sequences (C, D, D, C), and any one code sequence having the length of 1 among four second orthogonal code sequences OC2*a* and OC2*b* (having the length of 4) in each transmission period.

Thus, even when the radar transmission signal TX-RD2 transmitted from the sector radar #RD2 and the radar transmission signal TX-RD1 transmitted from the sector radar #RD1 are received in the sector radars #RD1 and #RD2, similarly, the interference components of the reception signals in the sector radars #RD1 and #RD2 become zero, and thus, the radar system 100 of the present embodiment is capable of suppressing the interference. That is, even when the phase rotation occurs in the reception signals according to fluctuation of the Doppler frequency, the radar system 100 of the present embodiment is capable of suppressing deterioration of the correlation characteristic of the reception signals, and is capable of suppressing the interference between plural sector radars.

(Modification Examples of the First Orthogonal Code Sequences and the Second Orthogonal Code Sequences in the Second Embodiment)

In the second embodiment, the first orthogonal code sequences OC1*a* and OC1*b*, and the second orthogonal code sequences OC2*a* and OC2*b* are as follows:
OC1*a*=[1, −1, 1, −1],
OC1*b*=[−1, 1, −1, 1],
OC2*a*=[1, −1, 1, −1], and
OC2*b*=[1, −1, 1, −1].

However, when the above-mentioned expression (3) is satisfied, the following examples may be used.
OC1*a*=[1, 1, 1, 1],
OC1*b*=[−1, 1, −1, 1],
OC2*a*=[1, −1, 1, −1], and
OC2*b*=[1, 1, 1, 1],
or
OC1*a*=[1, 1, 1, 1],
OC1*b*=[1, 1, 1, 1],
OC2*a*=[1, 1, 1, 1], and
OC2*b*=[−1, −1, −1, −1].

(Modification Examples of the First Orthogonal Code Sequences and the Second Orthogonal Code Sequences According to the Number of Spano Code Sequences)

As the Spano code sequences having a property that the correlation characteristic of the reception signals does not deteriorate even when the phase rotation is generated in the reception signals according to fluctuation of the Doppler frequency, 8 code sequences (A, B, B', A', B, A, A', B') and four code sequences (A, B, B, A) are known. Further, when Spano code sequences having 16 or 32 code sequences are present, the radar system 100 uses an example of the following combination as the first orthogonal code sequences OC1*a* and OC1*b* in the sector radar #RD1 and the second orthogonal code sequences OC2*a* and OC2*b* in the sector radar #RD2, to thereby make it possible to obtain the same effects as in the above-described embodiments.

For example, when the Spano code sequences having 16 code sequences are present, the first orthogonal code sequences OC1*a* and OC1*b* and the second orthogonal code sequences OC2*a* and OC2*b* are vectors having a length of 16, and for example, are as follows:
OC1*a*=[1, −1, 1, −1, 1, −1, 1, −1, 1, −1, 1, −1, 1, −1, 1, −1],
OC1*b*=[−1, 1, −1, 1, −1, 1, −1, 1, −1, 1, −1, 1, −1, 1, −1, 1],
OC2*a*=[1, −1, 1, −1, 1, −1, 1, −1, 1, −1, 1, −1, 1, −1, 1, −1], and
OC2*b*=[1, −1, 1, −1, 1, −1, 1, −1, 1, −1, 1, −1, 1, −1, 1, −1].

Further, when the above-mentioned expression (3) is satisfied, the following examples may be used.
OC1*a*=[1, 1, 1, 1, 1, 1, 1, 1, 1, 1, 1, 1, 1, 1, 1, 1],
OC1*b*=[−1, 1, −1, 1, −1, 1, −1, 1, −1, 1, −1, 1, −1, 1, −1, 1],
OC2*a*=[1, −1, 1, −1, 1, −1, 1, −1, 1, −1, 1, −1, 1, −1, 1, −1], and
OC2*b*=[1, 1, 1, 1, 1, 1, 1, 1, 1, 1, 1, 1, 1, 1, 1, 1],
or
OC1*a*=[1, 1, 1, 1, 1, 1, 1, 1, 1, 1, 1, 1, 1, 1, 1, 1],
OC1*b*=[1, 1, 1, 1, 1, 1, 1, 1, 1, 1, 1, 1, 1, 1, 1, 1],
OC2*a*=[1, 1, 1, 1, 1, 1, 1, 1, 1, 1, 1, 1, 1, 1, 1, 1], and
OC2*b*=[−1, −1, −1, −1, −1, −1, −1, −1, −1, −1, −1, −1, −1, −1, −1, −1].

Further, when the Spano code sequences having 32 code sequences are present, the first orthogonal code sequences OC1*a* and OC1*b* and the second orthogonal code sequences OC2*a* and OC2*b* are vectors having a length of 32, and for example, are as follows:
OC1*a*=[1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1],
OC1*b*=[−1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1],
OC2*a*=[1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1], and
OC2*b*=[1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1].

Further, when the above-mentioned expression (3) is satisfied, the following examples may be used.
OC1*a*=[1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1],
OC1*b*=[−1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1],
OC2*a*=[1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1], and OC2b=[1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1].

Or

OC1a=[1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1],

OC1b=[1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1],

OC2a=[1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1], and OC2b=[−1, −1, −1, −1, −1, −1, −1, −1, −1, −1, −1, −1, −1, −1, −1, −1, −1, −1, −1, −1, −1, −1, −1, −1, −1, −1, −1, −1, −1, −1, −1, −1].

(Third Embodiment)

In the first and second embodiments, the interference suppressing method for the interference wave generated in the same transmission period from the other sector radar has been described. In the third embodiment, an interference suppressing method in which an interference wave generated over adjacent transmission periods from the other sector radar is taken into consideration will be described.

Figure 9:
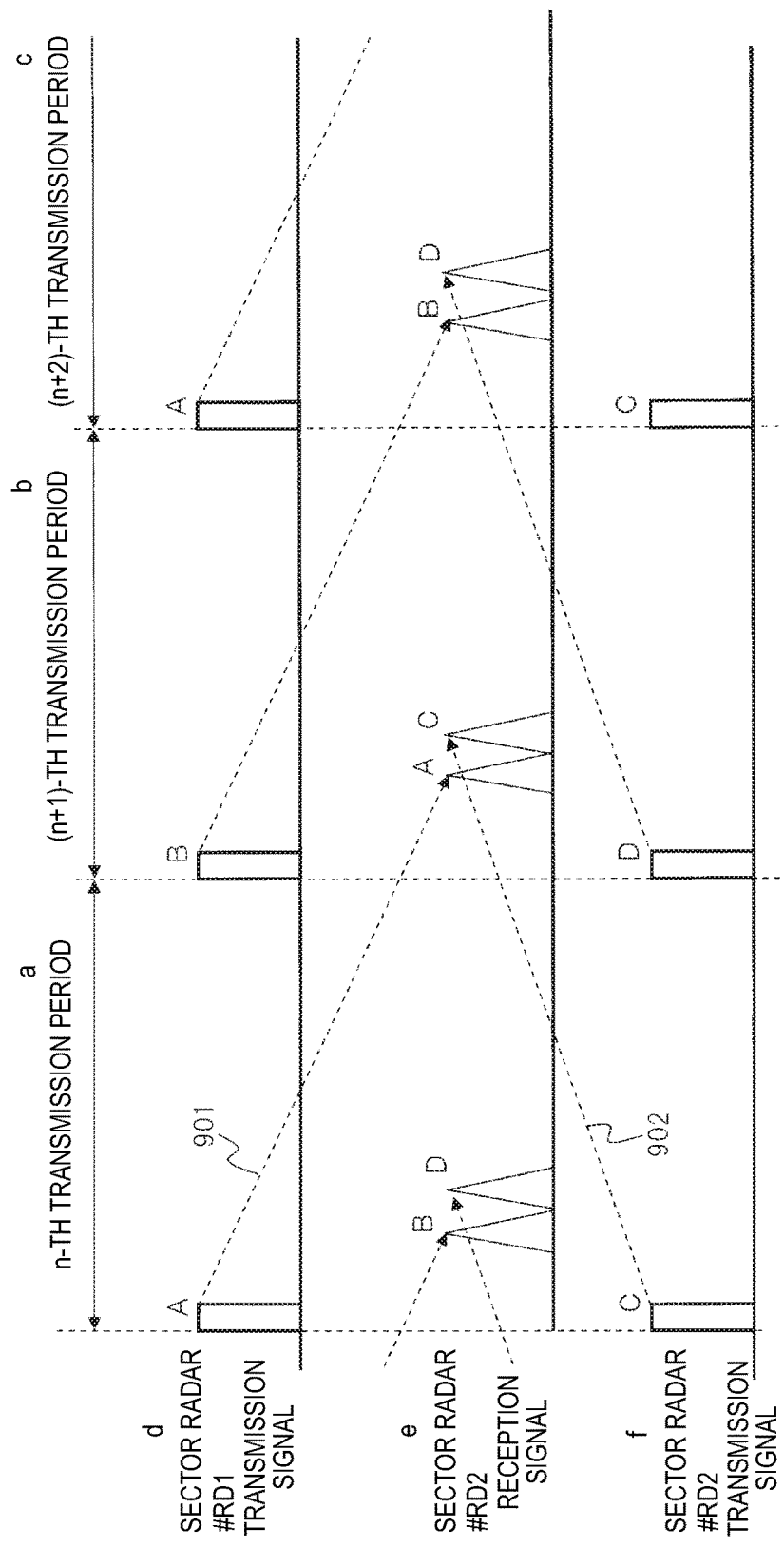
FIG. 9 is a diagram illustrating an interference wave in the sector radar #RD2 generated from the other sector radar #RD1 in an adjacent transmission period.

FIG. 9 is a diagram illustrating an interference wave 901 generated in an adjacent transmission period from the other sector radar #RD1 in the sector radar #RD2. When the sector radar #RD2 makes the interference suppression countermeasure for the interference wave generated in the adjacent transmission period from the other sector radar, the sector radar #RD2 also mekes an interference suppression countermeasure for an interference wave 902 generated over the adjacent transmission periods from the own sector radar, In FIG. 9, in the sector radar #RD2, reception timings of a reception signal waveform of the transmission code A transmitted from the sector radar #RD1 and a reception signal waveform of the transmission code C transmitted from the sector radar #RD2 are different, but in reality the reception signal waveforms are received at the same time.

Thus, in the present embodiment, a radar system that performs the interference suppression countermeasure using orthogonal code sequences for the interference wave 902 generated over the adjacent transmission periods from the own sector radar will be described.

For example, since $2^{(N+1)}$ sequences that correspond to a basic unit that reduces the influence of the Doppler phase fluctuation are arranged twice, and then, two interference suppression codes (orthogonal codes) that correspond to the same basic unit $2^{(N+1)}$ are multiplied, Spano codes configured using $M \times 2^{(N+1)}$ sequences become to $2 \times M \times 2^{(N+1)}$ sequences.

Here, in the $2 \times M \times 2^{(N+1)}$ sequences in which single-multiplication interference suppression codes (orthogonal codes) are multiplied, it is possible to suppress inter-range interference (inter-transmission period interference) generated between code sequences used by the other sector radar in the one sequence, that is, the one transmission period. However, it is not sufficient to suppress inter-range interference generated over continuous sequences, that is, adjacent transmission periods (sequential transmission periods), and thus, there is a possibility that inter-range interference (inter-transmission period interference) is generated between a tail end code of $2 \times M \times 2^{(N+1)}$ and a head code of the next $2 \times M \times 2^{(N+1)}$.

Thus, in the present embodiment, in order to suppress the inter-range interference in the continuous sequences, a multiplication process of double-multiplication interference suppression signals (orthogonal codes) is performed. In the multiplication process of the double-multiplication interference suppression codes (orthogonal codes), $2 \times M \times 2^{(N+1)}$ sequences are arranged twice, and two interference suppression codes (orthogonal codes) of $2 \times M \times 2^{(N+1)}$ sequences are multiplied.

That is, using the multiplication process of the double-multiplication interference suppression codes (orthogonal codes), it is possible to suppress the inter-range interference (inter-transmission period interference) for the Spano codes of $M \times 2^{(N+1)}$ sequences after the multiplication process of the single-multiplication interference suppression codes (orthogonal codes) for suppressing deterioration of the Doppler resistance.

Here, the sector radar #RD1 and #RD2 are capable of suppressing the interference wave generated in the same transmission period from the other sector radar by the method described in the first and second embodiments.

On the other hand, the sector radar #RD1 and #RD2 are capable of suppressing the interference wave (inter-range interference) generated over the adjacent transmission periods from the other sector radar by multiplying the code sequence for the suppression countermeasure of the inter-range interference (inter-transmission period interference), which is the single-multiplication interference suppression codes (orthogonal codes), by the orthogonal code for suppressing the inter-sector interference.

Thus, the code sequences that reduce deterioration of the Doppler resistance of the Spano codes proposed in the present era are sequences obtained by multiplying the Spano code sequences that are basic code sequences by quadruple orthogonal codes to be described later, that is, sequences obtained by four times multiplication of different orthogonal codes.

The code sequences that reduce deterioration of the Doppler resistance of the Spano codes proposed in the present embodiment suppress the interference wave generated in the same transmission period from the other sector radar, the interference wave generated over the adjacent transmission periods from the own sector radar, and the interference wave generated over the adjacent transmission periods from the other sector radar.

Here, basic Spano code sequences correspond to a basic unit of the Doppler phase fluctuation is $2^{(N+1)}$ sequences, the Spano code sequences are obtained by arranging different basic unit of K types, which are total $K \times 2^{(N+1)}$ sequences.

<Single-Multiplication Orthogonal Codes of Sector Radar #RD1>

Countermeasure for Interference Wave Generated in the Same Transmission Period from Other Sector Radar The orthogonal code multiplier 405a arranges $2^{(N+1)}$ Spano code sequences twice, and multiplies the $2^{(N+1)}$ Spano code sequences by $2^{(N+1)}$ orthogonal codes OC1a and OC1b, respectively. That is, the orthogonal code multiplier 405a multiplies the first $2^{(N+1)}$ Spano code sequences by the orthogonal codes OC1a, and multiplies the second $2^{(N+1)}$ Spano code sequences by the orthogonal codes OC1a. Thus, $2 \times 2^{(N+1)}$ Spano code sequences in which the single-multiplication orthogonal codes are multiplied are generated.

<Double-Multiplication Orthogonal Codes of Sector Radar #RD1>

Countermeasure for Interference Wave Generated Over Adjacent Transmission Periods from the Own Sector Radar The orthogonal code multiplier 405a arranges twice Spano code sequences $2 \times 2^{(N+1)}$ in which the single-multiplication orthogonal codes are multiplied, and multiplies the $2 \times 2^{(N+1)}$ Spano code sequences by $2 \times 2^{(N+1)}$ orthogonal codes OCR1a and OCR1b, respectively.

That is, the orthogonal code multiplier 405a multiplies the first $2 \times 2^{(N+1)}$ Spano code sequences by the $2 \times 2^{(N+1)}$ orthogonal codes OCR1$a$, and multiplies the second $2\times2^{(N+1)}$ Spano code sequences by the $2\times2^{(N+1)}$ orthogonal codes OCR1$b$. Thus, $2\times2^{(N+1)}$ Spano code sequences in which the double-multiplication orthogonal codes are multiplied are generated.

<Triple-Multiplication Orthogonal Codes of Sector Radar #RD1>

Countermeasure for Interference Wave Generated Over Adjacent Transmission Periods from the Own Sector Radar The orthogonal code multiplier 405$a$ repeats K times $2\times2\times2^{(N+1)}$ Spano code sequences in which the double-multiplication orthogonal codes are multiplied and arranges $4K\times2^{(N+1)}$, that is, $K\times2\times2\times2^{(N+1)}$ Spano code sequences twice, and multiplies the Spano code sequences by one sequence of orthogonal codes. For ease of explanations, hereinafter, it is described as K=2.

Thus, the orthogonal code multiplier 405$a$ multiplies the Spano code sequences in which the first (K=1) $2\times2^{(N+1)}$ orthogonal codes OCR1$a$ are multiplied by one sequence of orthogonal codes OCP1$a$1, and multiplies the Spano code sequences in which the first $2\times2^{(N+1)}$ orthogonal codes OCR1$b$ are multiplied by one sequence of orthogonal codes OCP1$b$1.

The orthogonal code multiplier 405$a$ multiplies the Spano code sequences in which the second (K=2) $2\times2^{(N+1)}$ orthogonal codes OCR1$a$ are multiplied by one sequence of orthogonal codes OCP1$a$1, and multiplies the Spano code sequences in which the second $2\times2^{(N+1)}$ orthogonal codes OCP1$b$1 are multiplied by one sequence of orthogonal codes OCP1$b$1.

The orthogonal code multiplier 405$a$ multiplies the Spano code sequences in which the third (K=1) $2\times2^{(N+1)}$ orthogonal codes OCR1$a$ are multiplied by one sequence of orthogonal codes OCP1$a$2, and multiplies the Spano code sequences in which the third $2\times2^{(N+1)}$ orthogonal codes OCP1$b$1 are multiplied by one sequence of orthogonal codes OCP1$b$2.

The orthogonal code multiplier 405$a$ multiplies the Spano code sequences in which the fourth (K=2) $2\times2^{(N+1)}$ orthogonal codes OCR1$a$ are multiplied by one sequence of orthogonal codes OCP1$a$2, and multiplies the Spano code sequences in which the fourth $2\times2^{(N+1)}$ orthogonal codes OCP1$b$1 are multiplied by one sequence of orthogonal codes OCP1$b$2. That is, $8K\times2^{(N+1)}$ Spano code sequences are generated.

<Quadruple-Multiplication Orthogonal Codes of Sector Radar #RD1>

Countermeasure for Interference Wave Generated Over Adjacent Transmission Periods from Other Sector Radar The orthogonal code multiplier 405$a$ arranges twice $8K\times2^{(N+1)}$ Spano code sequences in which the triple-multiplication orthogonal codes are multiplied, and multiplies the Spano code sequences by $8K\times2^{(N+1)}$ orthogonal codes OCQ1$a$ and OCQ1$b$, respectively. By multiplication of the quadruple-multiplication orthogonal codes, the total code sequences become 16 times, that is, $16K\times2^{(N+1)}$ sequences.

<Single-Multiplication Orthogonal Codes of Sector Radar #RD2>

Countermeasure for Interference Wave Generated in the Same Transmission Period from the Other Sector Radar The orthogonal code multiplier 405$a$ arranges twice $2^{(N+1)}$ Spano code sequences, and multiplies the Spano code sequences by $2^{(N+1)}$ orthogonal codes OC2$a$ and OC2$b$, respectively. That is, the orthogonal code multiplier 405$a$ multiplies the first $2^{(N+1)}$ Spano code sequences by the orthogonal codes OC2$a$, and multiplies the second $2^{(N+1)}$ Spano code sequences by the orthogonal codes OC2$a$. Thus, $2\times2^{(N+1)}$ Spano code sequences in which the single-multiplication orthogonal codes are multiplied are generated.

<Double-Multiplication Orthogonal Codes of Sector Radar #RD2>

Countermeasure for Interference Wave Generated Over Adjacent Transmission Periods from the Own Sector Radar The orthogonal code multiplier 405$a$ arranges twice $2\times2^{(N+1)}$ Spano code sequences in which the single-multiplication orthogonal codes are multiplied, and multiplies the Spano code sequences by $2\times2^{(N+1)}$ orthogonal codes OCR2$a$ and OCR2$b$, respectively.

The orthogonal code multiplier 405$a$ multiplies the first $2\times2^{(N+1)}$ Spano code sequences by the $2\times2^{(N+1)}$ orthogonal codes OCR2$a$, and multiplies the second $2\times2^{(N+1)}$ Spano code sequences by the $2\times2^{(N+1)}$ orthogonal codes OCR2$b$. Thus, $2\times2\times2^{(N+1)}$ Spano code sequences in which the double-multiplication orthogonal codes are multiplied are generated.

<Triple-Multiplication Orthogonal Codes of Sector Radar #RD2>

Countermeasure for Interference Wave Generated Over Adjacent Transmission Periods from the Own Sector Radar The orthogonal code multiplier 405$a$ repeats K times $2\times2\times2^{(N+1)}$ Spano code sequences in which the double-multiplication orthogonal codes are multiplied and arranges $4K\times2^{(N+1)}$, that is, $K\times2\times2\times2^{(N+1)}$ Spano code sequences twice, and multiplies the Spano code sequences by one orthogonal code. For ease of description, hereinafter, it is assumed that K=2.

Thus, the orthogonal code multiplier 405$a$ multiplies the Spano code sequences in which the first (K=1) $2\times2^{(N+1)}$ orthogonal codes OCR2$a$ are multiplied by one sequence of orthogonal codes OCP2$a$1, and multiplies the Spano code sequence in which the first $2\times2^{(N+1)}$ orthogonal codes OCR2$b$ are multiplied by one sequence of orthogonal codes OCP2$b$1.

The orthogonal code multiplier 405$a$ multiplies the Spano code sequences in which the second (K=2) $2\times2^{(N+1)}$ orthogonal codes OCR2$a$ are multiplied by one sequence of orthogonal codes OCP2$a$1, and multiplies the Spano code sequences in which the second $2\times2^{(N+1)}$ orthogonal codes OCR2$b$ are multiplied by one sequence of orthogonal codes OCP2$b$1.

The orthogonal code multiplier 405$a$ multiplies the Spano code sequences in which the third (K=1) $2\times2^{(N+1)}$ orthogonal codes OCR2$a$ are multiplied by one sequence of orthogonal codes OCP2$a$2, and multiplies the Spano code sequences in which the third $2\times2^{(N+1)}$ orthogonal codes OCR2$b$ are multiplied by one sequence of orthogonal codes OCP2$b$2.

Further, the orthogonal code multiplier 405$a$ multiplies the Spano code sequences in which the fourth (K=2) $2\times2^{(N+1)}$ orthogonal codes OCR2$a$ are multiplied by one sequence of orthogonal codes OCP2$a$2, and multiplies the Spano code sequences in which the fourth $2\times2^{(N+1)}$ orthogonal codes OCR2$b$ are multiplied by one sequence of orthogonal codes OCP2$b$2. That is, $8K\times2^{(N+1)}$ Spano code sequences are generated.

<Quadruple-Multiplication Orthogonal Codes of Sector 2>

Countermeasure for Interference Wave Generated Over Adjacent Transmission Periods from Other Sector Radar The orthogonal code multiplier 405$a$ arranges twice $8K\times2^{(N+1)}$ Spano code sequences in which the triple-multiplication orthogonal codes are multiplied, and multiplies the Spano code sequences by $8K\times2^{(N+1)}$ orthogonal codes OCQ2$a$ and OCQ2$b$, respectively. By multiplication of the quadruple-multiplication orthogonal codes, the total number of code sequences becomes 16, that is, $16K \times 2^{(N+1)}$ sequences.

Here, the orthogonal codes OC1a, OC1b, OC2a and OC2b are codes described in the first and second embodiment. The orthogonal codes OCQ1a, OCQ1b, OCQ2a and OCQ2b are codes generated by the same rule as in the orthogonal codes OC1a, OC1b, OC2a and OC2b of the first embodiment.

Further, the orthogonal codes OCR1a and OCP1b, the orthogonal codes OCR2a and OCR2b, the orthogonal codes OCP1a1, OCP1b1, OCP1a2 and OCP1b2, and the orthogonal codes OCP2a1, OCP2b1, OCP2a2 and OCP2b2 are codes for cancelling interference waves over adjacent transmission periods.

The codes for cancelling the interference waves refer to vectors in which a vector obtained by addition of vectors obtained by multiplication of two adjacent elements of vectors {OCR1a and OCP1b1} and vectors obtained by multiplication of two adjacent elements of vectors {OCR2a, OCR2b} is a zero vector (in which components are all zero).

Using the codes corresponding to the zero vector, the radar system is capable of cancelling the interference between the codes generated over the adjacent transmission periods by calculating the total coherent sum with the coherent adders 290a and 290b.

Here, for example, a radar system in which N=2 and K=2 will be described using "A, B, B', A', B, A, A', B', C, D, D', C', D, C, C', D'" as an example the Spano codes.

Figure 12:
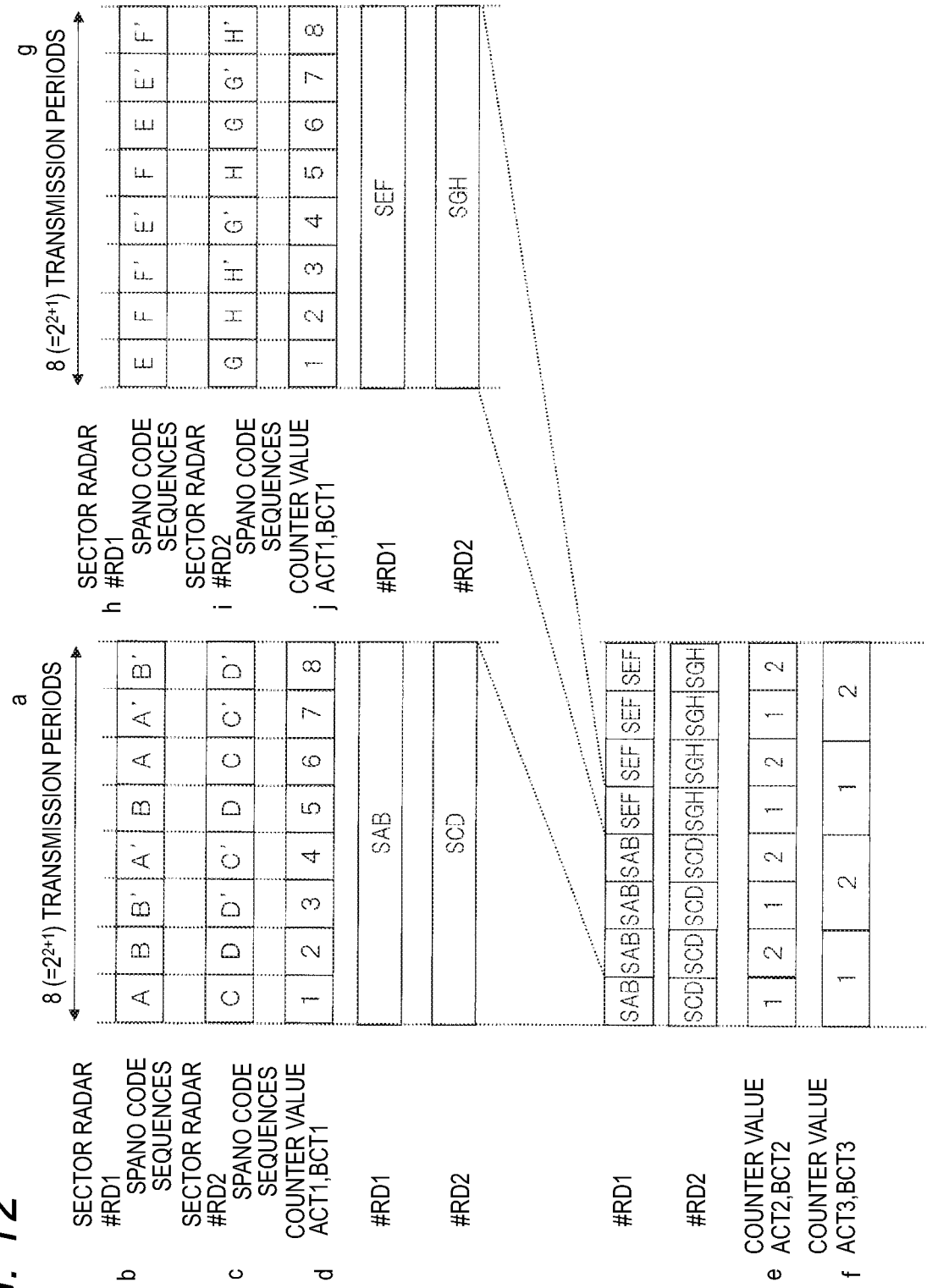
FIG. 12 is a diagram illustrating an example of the relationship between Spano code sequences and respective counter values used in each sector radar according to the third embodiment.

For ease of description, the sector radar #RD1 and #RD2 use as the Spano codes
SAB=[A, B, B', A', B, A, A', B'],
SEF=[E, F, F', E', F, E, E', F'],
SCD=[C, D, D', C', D, C, C', D'], and
SGH=[G, H, H', G', H, G, G', H'] (see FIG. 12). FIG. 12 is a diagram illustrating an example of the relationship between Spano code sequences and respective counter values used in each sector radar according to the third embodiment.

The orthogonal code controllers 404a and 404b use as the single-multiplication orthogonal codes
OC1a=[1, 1, 1, 1, 1, 1, 1, 1],
OC1b=[1, 1, 1, 1, 1, 1, 1, 1],
OC2a=[1, 1, 1, 1, 1, 1, 1, 1], and
OC2b=[−1, −1, −1, −1, −1, −1, −1, −1].

In the sector radar #RD1, the orthogonal code multiplier 405a performs the multiplication process of the single-multiplication orthogonal codes to calculate
SAB·OC1a,
SAB·OC1b,
SEF·OC1a, and
SEF·OC1b.

In the sector radar #RD2, the orthogonal code multiplier 405b performs the multiplication process of the single-multiplication orthogonal codes to calculate
SCD·OC2a,
SCD·OC2b,
SGH·OC2a, and
SGH·OC2b.

Here, since SCD·OC2a is an operation of the Spano codes and the orthogonal codes, SCD·OC2a is represented as [−C, −D, −D', −C', −D, −C, −C', −D'].

Next, the orthogonal code controllers 404a and 404b use as the double-multiplication orthogonal codes
OCR1a=OCR2a=[1, 1, 1, 1, 1, 1, 1, 1, 1, 1, 1, 1, 1, 1, 1], and OCP1b=OCR2b=[−1, 1, −1, 1, −1, 1, −1, 1, −1, 1, −1, 1, −1, 1, −1, 1].

In the sector radar #RD1, the orthogonal code multiplier 405a performs the multiplication process of the double-multiplication orthogonal codes, in which the result of the multiplication process of the single-multiplication orthogonal codes is arranged twice, and then, the double-multiplication orthogonal codes are multiplied, to calculate
(SAB·OC1a, SAB·OC1b)·OCR1a,
(SAB·OC1a, SAB·OC1b)·OCP1b1,
(SEF·OC1a, SEF·OC1b)·OCR1a, and
(SEF·OC1a, SEF·OC1b)·OCP1b1.

In the sector radar #RD2, the orthogonal code multiplier 405b performs the multiplication process of the double-multiplication orthogonal codes, in which the result of the multiplication process of the single-multiplication orthogonal codes is arranged twice, and then, the double-multiplication orthogonal codes are multiplied, to calculate
(SCD·OC2a, SCD·OC2b)·OCR2a,
(SCD·OC2a, SCD·OC2b)·OCR2b,
(SGH·OC2a, SGH·OC2b)·OCR2a, and
(SGH·OC2a, SGH·OC2b)·OCR2b.

Next, the orthogonal code controllers 404a and 404b use as the triple-multiplication orthogonal codes
OCP1a1=1,
OCP1b1=1,
OCP1a2=1,
OCP1b2=−1,
OCP2a1=1,
OCP2b1=1,
OCP2a2=1, and
OCP2b2=−1, The orthogonal codes OCP are vectors having a length of 1, and are generated based on the above-mentioned expression (3). With respect to the code sequences to be multiplied, the same orthogonal code is uniformly The orthogonal codes OCR and the orthogonal codes OC are vectors having the same length as the length of the number of the code sequences to be multiplied. Here, an 1-th orthogonal code and an 1-th code sequence are multiplied.

In the sector radar #RD1, the orthogonal code multiplier 405a performs the multiplication process of the triple-multiplication orthogonal codes, in which the result of the multiplication process of the double-multiplication orthogonal codes is repeated twice and then is arranged twice, to calculate
(SAB·OC1a, SAB·OC1b)·OCR1a·OCP1a1,
(SAB·OC1a, SAB·OC1b)·OCP1b·OCP1b1,
(SEF·OC1a, SEF·OC1b)·OCR1a·OCP1a1,
(SEF·OC1a, SEF·OC1b)·OCP1b·OCP1b1,
(SAB·OC1a, SAB·OC1b)·OCR1a·OCP1a2,
(SAB·OC1a, SAB·OC1b)·OCP1b·OCP1b2,
(SEF·OC1a, SEF·OC1b)·OCR1a·OCP1a2, and
(SEF·OC1a, SEF·OC1b)·OCP1b·OCP1b2.

In the sector radar #RD2, the orthogonal code multiplier 405b performs the multiplication process of the triple-multiplication orthogonal codes, in which the result of the multiplication process of the double-multiplication orthogonal codes is repeated twice and then is arranged twice, to calculate
(SCD·OC2a, SCD·OC2b)·OCR2a·OCP2a1,
(SCD·OC2a, SCD·OC2b)·OCR2b·OCP2b1,
(SGH·OC2a, SGH·OC2b)·OCR2a·OCP2a1,
(SGH·OC2a, SGH·OC2b)·OCR2b·OCP2b1,
(SCD·OC2a, SCD·OC2b)·OCR2a·OCP2a2,
(SCD·OC2a, SCD·OC2b)·OCR2b·OCP2b2,
(SGH·OC2a, SGH·OC2b)·OCR2a·OCP2a2, and
(SGH·OC2a, SGH·OC2b)·OCR2b·OCP2b2.

Next, the orthogonal code controllers 404*a* and 404*b* use the orthogonal codes OCQ1*a* OCQ1*b*, OCQ2*a*, and OCQ2*b* as the quadruple-multiplication orthogonal codes. The orthogonal codes OCQ1*a*, OCQ1*b*, and OCQ2*a* are vectors of which all components are 1 and the length is 128, and the orthogonal codes OCQ2*b* is a vector of which all components are −1 and the length is 128.

In the sector radar #RD1, the orthogonal code multiplier 405*a* performs the multiplication process of the quadruple-multiplication orthogonal codes, in which the result of the multiplication process of the triple-multiplication orthogonal codes is repeated twice and then is arranged twice, and the orthogonal codes are multiplied, to calculate (SAB·OC1*a*, SAB·OC1*b*)·OCR1*a*·OCP1*a*1·OCQ1*a*,
(SAB·OC1*a*, SAB·OC1*b*)·OCP1*b*1·OCP1*b*1·OCQ1*a*,
(SEF·OC1*a*, SEF·OC1*b*)·OCR1*a*·OCP1*a*1·OCQ1*a*,
(SEF·OC1*a*, SEF·OC1*b*)·OCP1*b*1·OCP1*b*1·OCQ1*a*,
(SAB·OC1*a*, SAB·OC1*b*)·OCR1*a*·OCP1*a*2·OCQ1*a*,
(SAB·OC1*a*, SAB·OC1*b*)·OCP1*b*1·OCP1*b*2·OCQ1*a*,
(SEF·OC1*a*, SEF·OC1*b*)·OCR1*a*·OCP1*a*2·OCQ1*a*,
(SEF·OC1*a*, SEF·OC1*b*)·OCP1*b*1·OCP1*b*2·OCQ1*a*,
(SAB·OC1*a*, SAB·OC1*b*)·OCR1*a*·OCP1*a*1·OCQ1*b*,
(SAB·OC1*a*, SAB·OC1*b*)·OCP1*b*1·OCP1*b*1·OCQ1*b*,
(SEF·OC1*a*, SEF·OC1*b*)·OCR1*a*·OCP1*a*1·OCQ1*b*,
(SEF·OC1*a*, SEF·OC1*b*)·OCP1*b*1·OCP1*b*1·OCQ1*b*,
(SAB·OC1*a*, SAB·OC1*b*)·OCR1*a*·OCP1*a*2·OCQ1*b*,
(SAB·OC1*a*, SAB·OC1*b*)·OCP1*b*1·OCP1*b*2·OCQ1*b*,
(SEF·OC1*a*, SEF·OC1*b*)·OCR1*a*·OCP1*a*2·OCQ1*b*, and
(SEF·OC1*a*, SEF·OC1*b*)·OCP1*b*1·OCP*b*2·OCQ1*b*.

In the sector radar #RD2, the orthogonal code multiplier 405*b* performs the multiplication process of the quadruple-multiplication orthogonal codes, in which the result of the multiplication process of the triple-multiplication orthogonal codes is repeated twice and then is arranged twice, the double-multiplication orthogonal codes are multiplied, to calculate (SCD·OC2*a*, SCD·OC2*b*)·OCR2*a*·OCP2*a*1·OCQ2*a*,
(SCD·OC2*a*, SCD·OC2*b*)·OCR2*b*·OCP2*b*1·OCQ2*a*,
(SGH·OC2*a*, SGH·OC2*b*)·OCR2*a*·OCP2*a*1·OCQ2*a*,
(SGH·OC2*a*, SGH·OC2*b*)·OCR2*b*·OCP2*b*1·OCQ2*a*,
(SCD·OC2*a*, SCD·OC2*b*)·OCR2*a*·OCP2*a*2·OCQ2*a*,
(SCD·OC2*a*, SCD·OC2*b*)·OCR2*b*·OCP2*b*2·OCQ2*a*,
(SGH·OC2*a*, SGH·OC2*b*)·OCR2*a*·OCP2*a*2·OCQ2*a*,
(SGH·OC2*a*, SGH·OC2*b*)·OCR2*b*·OCP2*b*2·OCQ2*a*,
(SCD·OC2*a*, SCD·OC2*b*)·OCR2*a*·OCP2*a*1·OCQ2*b*,
(SCD·OC2*a*, SCD·OC2*b*)·OCR2*b*·OCP2*b*1·OCQ2*b*,
(SGH·OC2*a*, SGH·OC2*b*)·OCR2*a*·OCP2*a*1·OCQ2*b*,
(SGH·OC2*a*, SGH·OC2*b*)·OCR2*b*·OCP2*b*1·OCQ2*b*,
(SCD·OC2*a*, SCD·OC2*b*)·OCR2*a*·OCP2*a*2·OCQ2*b*,
(SCD·OC2*a*, SCD·OC2*b*)·OCR2*b*·OCP2*b*2·OCQ2*b*,
(SGH·OC2*a*, SGH·OC2*b*)·OCR2*a*·OCP2*a*2·OCQ2*b*, and
(SGH·OC2*a*, SGH·OC2*a*)·OCR2*b*·OCP2*b*2·OCQ2*b*.

Figure 10:
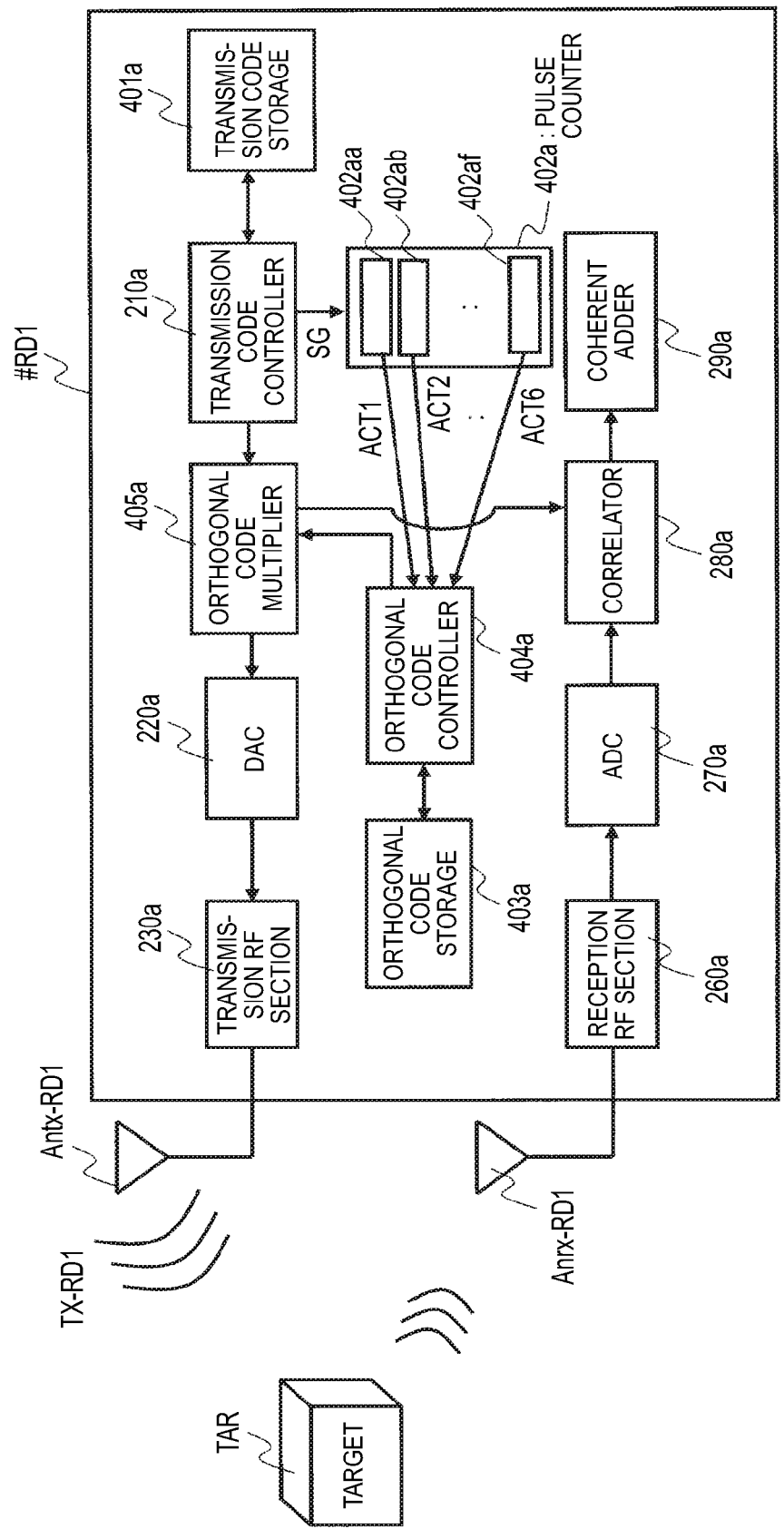
FIG. 10 is a block diagram illustrating an internal configuration of a sector radar #RD1 that forms a radar system of a third embodiment.
Figure 11:
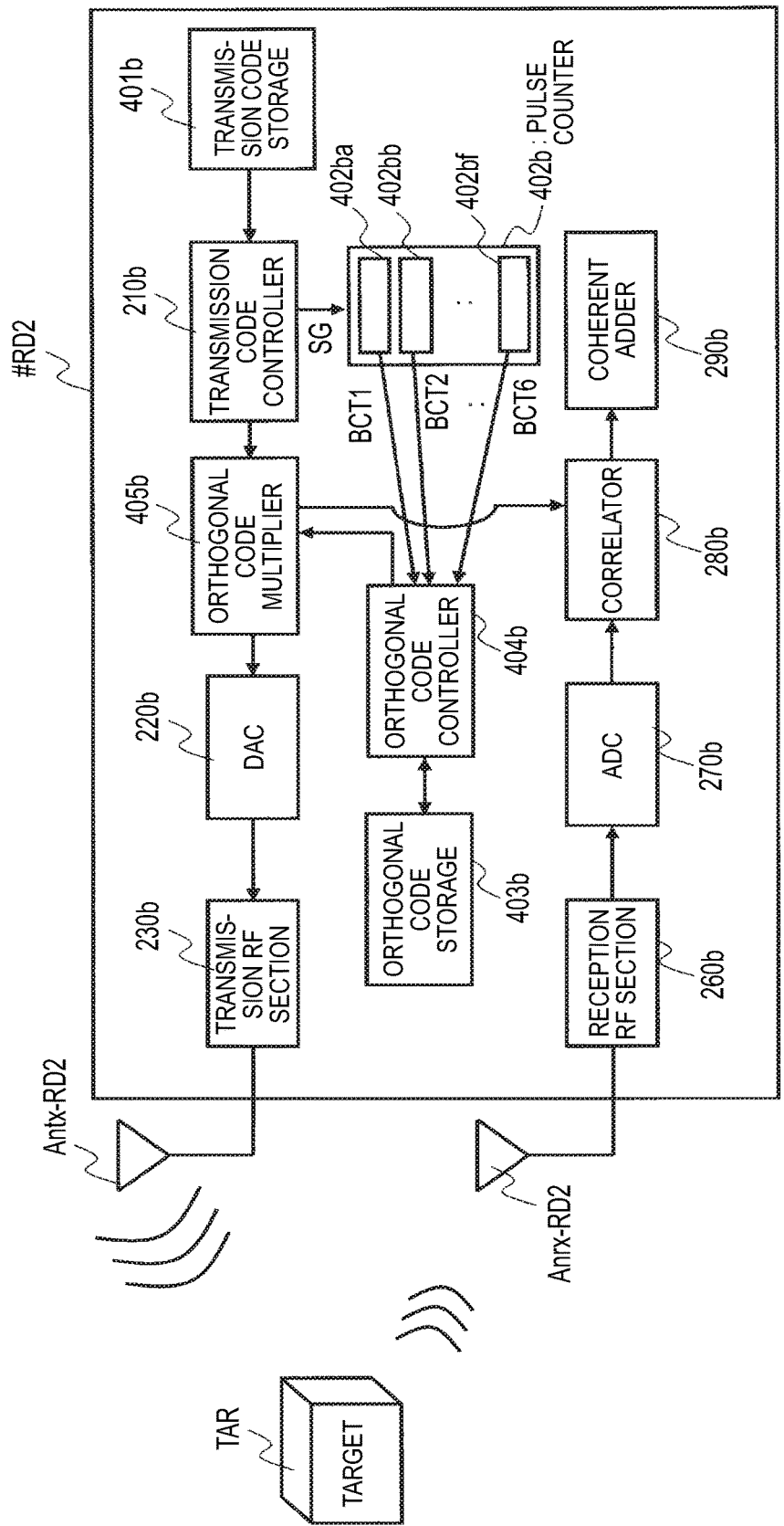
FIG. 11 is a block diagram illustrating an internal configuration of a sector radar #RD2 that forms the radar system of the third embodiment.

FIGS. 10 and 11 are block diagrams illustrating internal configurations of the sector radars #RD1 and #RD2 that form the radar system of the third embodiment. A difference between the first embodiment and the second embodiment is that the number of counters included in the pulse counters 402*a* and 402*b* increases and the types of orthogonal codes multiplied corresponding to values of the counters increases.

Operations of the pulse counters 402*a* and 402*b* will be described with reference to FIGS. 12 and 13, FIG. 13 is a diagram illustrating an example of the relationship between Spano code sequences, respective counter values, and orthogonal codes used in each sector radar according to the third embodiment.

In the present embodiment, according to the values of the respective counters ACT2, ACT3, ACT4, ACT5, ACT6, BCT2, BCT3, BCT4, BCT5, and BCT6, four types of orthogonal codes are selected.

Further, the values of the counters ACT1 and BCT1 shown in FIG. 12 are sequentially changed to values of 1 to 8 whenever a transmission signal of Spano code sequences is transmitted. Eight pulses of A, B, B', A', B, A, A', and B corresponding to the values 1 to 8 to which the value of the counter ACT1 is sequentially changed are collected to be expressed as SAB. Similarly, eight pulses are collected to be expressed as SCD, SEF, and SGH.

Next, the values of the counters ACT2 and BCT2 are changed whenever the values of the counters ACT1 and BCT1 are counted up to 8 to become 1 or 2.

Next, the values of the counters ACT3 and BCT3 are changed whenever the values of the counters ACT2 and BCT2 are counted up to 8 to become 1 or 2, Next, in FIG. 13, the values of the counters ACT4 and BCT4 are changed whenever the values of the counters ACT3 and BCT3 are counted up to 2 to become 1 or 2.

Next, the values of the counters ACT5 and BCT5 are changed whenever the values of the counters ACT4 and BCT4 are counted up to 2 to become 1 or 2.

Next, the values of the counters ACT6 and BCT6 are changed whenever the values of the counters ACT5 and BCT5 are counted up to 2 to become 1 or 2.

Further, as the single-multiplication orthogonal codes (see "orthogonal codes 1" shown in FIG. 13), the orthogonal code controller 404*a* of the sector radar #RD1 selects the orthogonal codes OC1*a* when the value of the counter ACT2 is 1, and selects the orthogonal codes OC1*b* when the value of the counter ACT2 is 2.

Similarly, as the single-multiplication orthogonal codes (see "orthogonal codes 1" shown in FIG. 13), the orthogonal code controller 404*b* of the sector radar #RD2 selects the orthogonal codes OC2*a* when the value of the counter BCT2 is 1, and selects the orthogonal codes OC2*b* when the value of the counter BCT2 is 2.

Further, as the double-multiplication orthogonal codes (see "orthogonal codes 2" shown in FIG. 13), the orthogonal code controller 404*a* of the sector radar #RD1 selects the orthogonal codes OCR1*a* when the value of the counter ACT3 is 1, and selects the orthogonal codes OCP1*b* when the value of the counter ACT3 is 2.

Similarly, as the double-multiplication orthogonal codes (see "orthogonal codes 2" shown in FIG. 13), the orthogonal code controller 404*b* of the sector radar #RD2 selects the orthogonal codes OCR2*a* when the value of the counter BCT3 is 1, and selects the orthogonal codes OCR2*b* when the value of the counter BCT3 is 2.

Further, as the triple-multiplication orthogonal codes (see "orthogonal codes 3" shown in FIG. 13), the orthogonal code controller 404*a* of the sector radar #RD1 selects the orthogonal codes OCP1*a*1 when the value of the counter ACT3 is 1 and the value of the counter ACT5 is 1, selects the orthogonal codes OCP1*b*1 when the value of the counter ACT3 is 2 and the value of the counter ACT5 is 1, selects the orthogonal codes OCP1*a*2 when the value of the counter ACT3 is 1 and the value of the counter ACT5 is 2, and selects the orthogonal codes OCP1*b*2 when the value of the counter ACT3 is 2 and the value of the counter ACT5 is 2.

Similarly, as the triple-multiplication orthogonal codes (see "orthogonal codes 3" shown in FIG. 13), the orthogonal code controller 404*b* of the sector radar #RD2 selects the orthogonal codes OCP2*a*1 when the value of the counter BCT3 is 1 and the value of the counter BCT5 is 1, selects the orthogonal codes OCP2*b*1 when the value of the counter BCT3 is 2 and the value of the counter BCT5 is 1, selects the orthogonal codes OCP2a2 when the value of the counter BCT3 is 1 and the value of the counter BCT5 is 2, and selects the orthogonal codes OCP2b2 when the value of the counter BCT3 is 2 and the value of the counter BCT5 is 2.

Further, as the quadruple-multiplication, orthogonal codes (see "orthogonal codes 4" shown in FIG. 13), the orthogonal code controller 404a of the sector radar #RD1 selects the orthogonal codes OCQ1a when the value of the counter ACT6 is 1, and selects the orthogonal codes OCQ1b when the value of the counter ACT6 is 2.

Similarly, as the quadruple-multiplication codes (see "orthogonal codes 4" shown in FIG. 13), the orthogonal code controller 404b of the sector radar #RD2 selects the orthogonal codes OCQ2a when the value of the counter BCT6 is 1, and selects the orthogonal codes OCQ2b when the value of the counter BCT6 is 2.

The orthogonal codes selected by the respective counters are multiplied by the transmission signals output from the transmission code controllers 210a and 210b in the orthogonal code multipliers 405a and 405b shown in FIGS. 11 and 12.

For example, in the sector radar #RD2, when the respective counter values in FIG. 13 are the value of the counter BCT2=2, the value of the counter BCT3=2, the value of the counter BCT4=1, the value of the counter BCT5=1, and the value of the counter BCT6=2, respectively, (1) the single-multiplication orthogonal codes are OC2a having a code length of 8, that is, [−1, −1, −1, −1, −1, −1, −1, −1], (2) the double-multiplication orthogonal codes are OCR2b having a code length of 16, that is, [−1, 1, −1, 1, −1, 1, −1, 1, −1, 1, −1, 1, −1, 1, −1, 1], (3) the triple-multiplication orthogonal codes are OCP2b1 having a code length of 1, that is, 1, (4) the quadruple-multiplication orthogonal codes are OCQ2b that is a vector of which all components are −1 and the length is 128.

Thus, at the timings when the above-described values of the respective counters are obtained, eight pulses (C, D, D', C', D, C, C', D') of SCD are transmitted.

The i-th pulse (for example, D' when i=3) of SCD is transmitted as a −D' pulse of $(-1) \times (-1) \times (+1) \times (-1) \times (D') = (-D')$ obtained by multiplication of the i-th code (for example, −1 when i=3) of the single-multiplication orthogonal codes OC1a, the (8+i)-th code (for example, −1 when i=3) of the double-multiplication orthogonal codes OCP1b1, the code 1 of the triple-multiplication orthogonal codes OCP1b1, and the i-th code (for example, −1 when i=3) of the quadruple-multiplication orthogonal codes OCQ1b.

The double-multiplication, triple-multiplication and quadruple-multiplication orthogonal codes have vector lengths of 16, 16, and 128, respectively. Here, regarding the order of vectors to be selected, it is necessary to select the order after the orthogonal codes are selected.

The reason why the (8+i)-th code is selected in the double-multiplication orthogonal codes is because as the double-multiplication orthogonal codes, the orthogonal codes OCR2b are selected from the value of the counter BCT2=1, the value of the counter BCT3=2, the value of the counter BCT4=1, the value of the counter BCT5=1, and the value of the counter BCT6=2, and the first eight codes are used therefor.

As described above, the radar system of the present embodiment selects the above-described quadruple-multiplication orthogonal codes for multiplication, to thereby make it possible to suppress the interference wave generated in the same transmission period from the other sector radar, the interference wave generated over the adjacent transmission periods from the own sector radar, and the interference wave generated over the adjacent transmission periods from the other sector radar.

(Fourth Embodiment)

In the third embodiment, the quadruple-multiplication orthogonal codes are multiplied by the code sequences in order to suppress the interference wave generated in the same transmission period from the other sector radar, the interference wave generated over the adjacent transmission periods from the own sector radar, and the interference wave generated over the adjacent transmission periods from the other sector radar.

In the fourth embodiment, as the single-multiplication orthogonal codes and the double-multiplication orthogonal codes in the third embodiment are used together, the same interference suppression as in the third embodiment is realized by three times multiplication of the orthogonal codes.

Here, the single-multiplication orthogonal codes used in the third embodiment suppress the interference wave generated in the same transmission period from the other sector radar, and the double-multiplication orthogonal codes suppress the interference wave generated over the adjacent transmission periods from the own sector radar.

An example of the orthogonal codes in the third embodiment is as follows.

For example, the single-orthogonal codes are as follows:
OC1a=[1, 1, 1, 1, 1, 1, 1, 1],
OC1b=[1, 1, 1, 1, 1, 1, 1, 1],
OC2a=[1, 1, 1, 1, 1, 1, 1, 1], and
OC2b=[−1, −1, −1, −1, −1, −1, −1, −1], Further, the double-multiplication orthogonal codes are as follows:
OCR1a=[1, 1, 1, 1, 1, 1, 1, 1, 1, 1, 1, 1, 1, 1, 1, 1],
OCR2a=[1, 1, 1, 1, 1, 1, 1, 1, 1, 1, 1, 1, 1, 1, 1, 1],
OCP1b=[−1, 1, −1, 1, −1, 1, −1, 1, −1, 1, −1, 1, −1, 1, −1, 1], and
OCR2b=[−1, 1, −1, 1, −1, 1, −1, 1, −1, 1, −1, 1, −1, 1, −1, 1].

In the present embodiment, the interference suppression can be realized by the following orthogonal codes in consideration of the same orthogonal codes as two types of orthogonal codes of the above-described single-multiplication orthogonal codes and double-multiplication orthogonal codes used in the third embodiment.

Specifically, the following orthogonal codes may be used:
OCX1a=[1, 1, 1, 1, 1, 1, 1, 1],
OCX1b=[−1, 1, −1, 1, −1, 1, −1, 1],
OCX2a=[1, 1, 1, 1, 1, 1, 1, 1], and
OCX2b=[1, −1, 1, −1, 1, −1, 1, −1].

By using the above-mentioned OCX1a OCX1b, OCX2a and OCX2b, it is possible to use together the single-multiplication orthogonal codes and the double-multiplication orthogonal codes in the third embodiment, and to realize the same interference suppressing characteristic as in the third embodiment by the triple-multiplication orthogonal codes, that is, by three times multiplication of the orthogonal codes.

In the present embodiment, as the number of the multiplication processes of the orthogonal codes is reduced by one stage, the number of all sequences is reduced by half, and thus, it is possible to reduce redundant pulse transmissions.

Hereinafter, the multiplication process of the orthogonal codes in the present embodiment will be described.

<Single-Multiplication Orthogonal Codes of Sector Radar #RD1>

Countermeasure for Interference Wave Generated in the Same Transmission Period from the Other Sector Radar and Countermeasure for Interference Wave Generated Over Adjacent Transmission Periods from the Own Sector Radar The orthogonal code multiplier 405a arranges $2^{(N+1)}$ Spano code sequences twice, and multiplies the $2^{(N+1)}$ Spano code sequences by $2^{(N+1)}$ orthogonal codes OCX1a and OCX1b, respectively. That is, the orthogonal code multiplier 405a multiplies the first $2^{(N+1)}$ Spano code sequences by the orthogonal codes OCX1a, and multiples the second $2^{(N+1)}$ Spano code sequences by the orthogonal codes OCX1b. Thus, $2 \times 2^{(N+1)}$ Spano code sequences in which the single-multiplication orthogonal codes are multiplied are generated.

<Double-Multiplication Orthogonal Codes of Sector Radar #RD1>

Countermeasure for Interference Wave Generated Over Adjacent Transmission Periods from the Own Sector Radar The orthogonal code multiplier 405a repeats K times $2 \times 2^{(N+1)}$ Spano code sequences in which the single-multiplication orthogonal codes are multiplied, that is, arranges $2K \times 2^{(N+1)}$ Spano code sequences twice, and multiplies the Spano code sequences by one sequence of orthogonal codes of the same number as the code length of the single-multiplication orthogonal codes. Hereinafter, it is assumed that K=2.

Thus, the orthogonal code multiplier 405a multiplies the Spano code sequences in which the first (K=1) $2 \times 2^{(N+1)}$ orthogonal codes OCX1a are multiplied by one sequence of orthogonal codes OCP1a1, and multiplies the Spano code sequences in which the first $2 \times 2^{(N+1)}$ orthogonal codes OCX1b are multiplied by one sequence of orthogonal codes OCP1b1.

The orthogonal code multiplier 405a multiplies the Spano code sequences in which the second (K=2) $2 \times 2^{(N+1)}$ orthogonal codes OCX1a are multiplied by one sequence of orthogonal codes OCP1a1, and multiplies the Spano code sequences in which the second $2 \times 2^{(N+1)}$ orthogonal codes OCX1b are multiplied by one sequence of orthogonal codes OCP1b1.

The orthogonal code multiplier 405a multiplies the Spano code sequences in which the third (K=1) $2 \times 2^{(N+1)}$ orthogonal codes OCX1a are multiplied by one sequence of orthogonal codes OCP1a2, and multiplies the Spano code sequences in which the third $2 \times 2^{(N+1)}$ orthogonal codes OCX1b are multiplied by one sequence of orthogonal codes OCP1b2.

Further, the orthogonal code multiplier 405a multiplies the Spano code sequences in which the fourth (K=2) $2 \times 2^{(N+1)}$ orthogonal codes OCX1a are multiplied by one sequence of orthogonal codes OCP1a2, and multiplies the Spano code sequences in which the fourth $2 \times 2^{(N+1)}$ orthogonal codes OCX1b are multiplied by one sequence of orthogonal codes OCP1b2. That is, $4K \times 2^{(N+1)}$ Spano code sequences are generated.

<Triple Multiplication Orthogonal Codes of Sector Radar #RD1>

Countermeasure for Interference Wave Generated Over Adjacent Transmission Periods from Other Sector Radar The orthogonal code multiplier 405a arranges twice $4K \times 2^{(N+1)}$ Spano code sequences in which the double-multiplication orthogonal codes are multiplied, and multiplies the Spano code sequences by $4K \times 2^{(N+1)}$ orthogonal codes OCQ1a and OCQ1b, respectively. By multiplication of the triple-multiplication orthogonal codes, the total number of code sequences becomes 8 times, that is, $8K \times 2^{(N+1)}$ sequences.

<Single-Multiplication Orthogonal Codes of Sector Radar #RD2>

Countermeasure for Interference Wave Generated in the Same Transmission Period from Other Sector Radar and Countermeasure for Interference Wave Generated. Over Adjacent Transmission. Periods from the Own Sector Radar The orthogonal code multiplier 405b arranges $2^{(N+1)}$ Spano code sequences twice, and multiplies the $2^{(N+1)}$ Spano code sequences by $2^{(N+1)}$ orthogonal codes OCX2a and OCX2b, respectively. That is, the orthogonal code multiplier 405b multiplies the first $2^{(N+1)}$ Spano code sequences by the orthogonal codes OCX2a, and multiplies the second $2^{(N+1)}$ Spano code sequences by the orthogonal codes OCX2b. Thus, $2 \times 2^{(N+1)}$ Spano code sequences in which the single-multiplication orthogonal codes are multiplied are generated.

<Double-Multiplication Orthogonal Codes of Sector Radar #RD2>

Countermeasure for Interference Wave Generated Over Adjacent Transmission Periods from the Own Sector Radar The orthogonal code multiplier 405b repeats K-times $2 \times 2^{(N+1)}$ Spano code sequences in which the single-multiplication orthogonal codes are multiplied, that is, arranges $2K \times 2^{(N+1)}$ Spano code sequences twice, and multiplies the Spano code sequences by one sequence of orthogonal codes of the same number as the code length of the single-multiplication orthogonal codes. Hereinafter, it is assumed that K=2.

Thus, the orthogonal code multiplier 405b multiplies the Spano code sequences in which the first (K=1) $2 \times 2^{(N+1)}$ orthogonal codes OCX2a are multiplied by one sequence of orthogonal codes OCP2a1 and multiplies the Spano code sequences in which the first $2 \times 2^{(N+1)}$ orthogonal codes OCX2b are multiplied by one sequence of orthogonal codes OCP2b1.

The orthogonal code multiplier 405b multiplies the Spano code sequences in which the second (K=2) $2 \times 2^{(N+1)}$ orthogonal codes OCX2a are multiplied by one sequence of orthogonal codes OCP2a1, and multiplies the Spano code sequences in which the second $2 \times 2^{(N+1)}$ orthogonal codes OCX2b are multiplied by one sequence of orthogonal codes OCP2b1.

The orthogonal code multiplier 405b multiplies the Spano code sequences in which the third (K=1) $2 \times 2^{(N+1)}$ orthogonal codes OCX2a are multiplied by one sequence of orthogonal codes OCP2a2, and multiplies the Spano code sequences in which the third $2 \times 2^{(N+1)}$ orthogonal codes OCX2b are multiplied by one sequence of orthogonal codes OCP2b2.

Further, the orthogonal code multiplier 405b multiplies the Spano code sequences in which the fourth (K=2) $2 \times 2^{(N+1)}$ orthogonal codes OCX2a are multiplied by one sequence of orthogonal codes OCP2a2, and multiplies the Spano code sequences in which the fourth $2 \times 2^{(N+1)}$ orthogonal codes OCX2b are multiplied by one sequence of orthogonal codes OCP2b2. That is, $4K \times 2^{(N+1)}$ Spano code sequences are generated.

<Triple-Multiplication Orthogonal Codes of Sector Radar #RD2>

Countermeasure for Interference Wave Generated Over Adjacent Transmission Periods from Other Sector Radar The orthogonal code multiplier 405b arranges twice $4K \times 2^{(N+1)}$ Spano code sequences in which the double-multiplication orthogonal codes are multiplied, and multiplies the Spano code sequences by $4K \times 2^{(N+1)}$ orthogonal codes OCQ2a and OCQ2b, respectively. By multiplication of the triple-multiplication orthogonal codes, the total number of code sequences becomes 8 times, that is, $8K \times 2^{(N+1)}$ sequences.

Here, for example, a system in which N=2 and K=2 will be described using "A, B, B', A', B, A, A', B', C, D, D', C', D, C, C', D'" as an example of the Spano codes.

Figure 16:
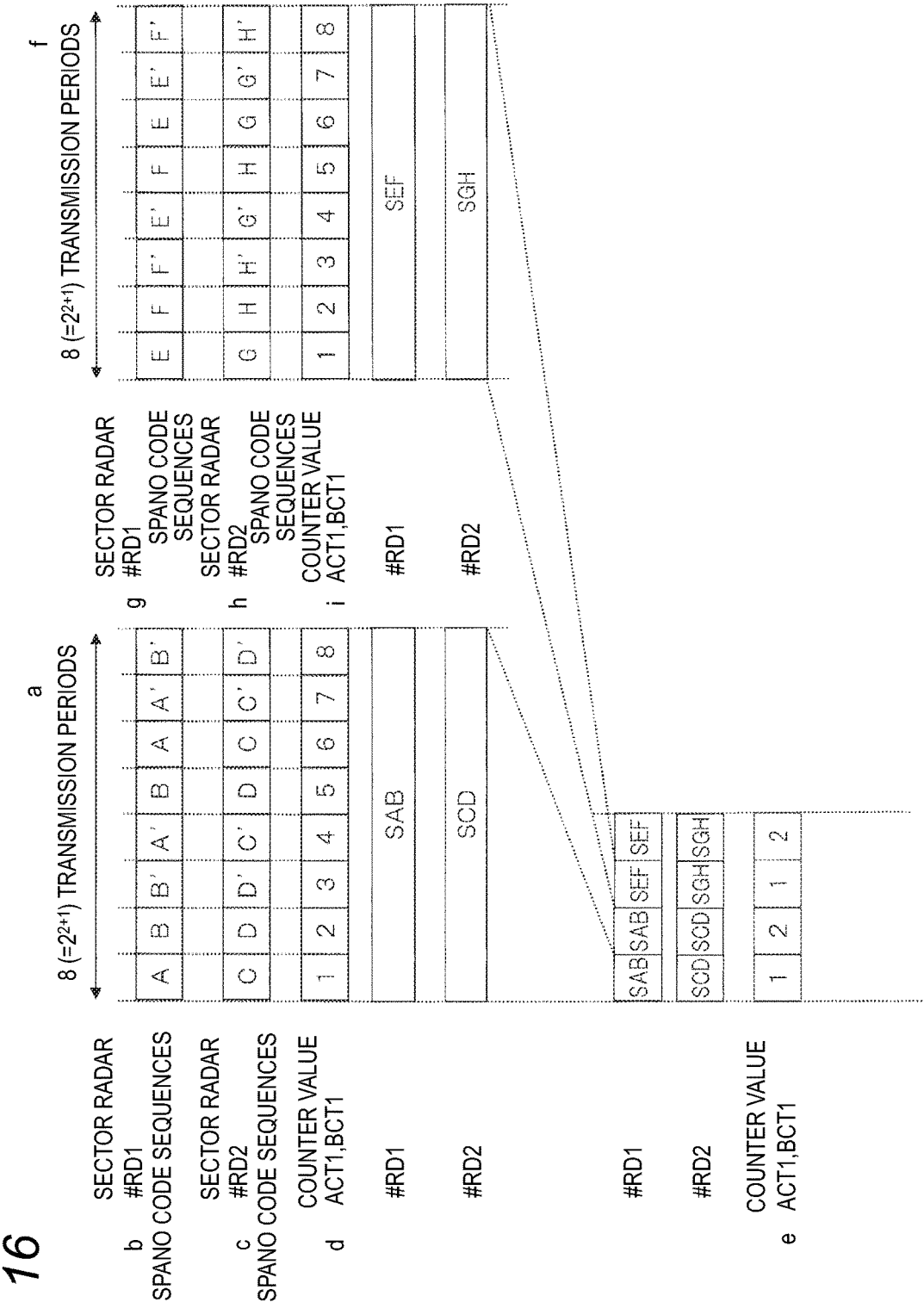
FIG. 16 is a diagram illustrating an example of the relationship between Spano code sequences and respective counter values used in each sector radar according to the fourth embodiment.

For ease of description, it is assumed that
SAB=[A, B, B', A', B, A, A', B'],
SEF=[E, F, F', E', F, E, E', F'],
SCD=[C, D, D', C', D, C, C', D'], and
SGH=[G, H, H', G', H, G, G', H'] (see FIG. 16). FIG. 16 is a diagram illustrating an example of the relationship between Spano code sequences and respective counter values used in each sector radar according to the fourth embodiment.

The orthogonal code controllers 404a and 404b use as the single-multiplication orthogonal codes
OCX1a=[1, 1, 1, 1, 1, 1, 1, 1],
OCX1b=[-1, 1, -1, 1, -1, 1, -1, 1],
OCX2a=[1, 1, 1, 1, 1, 1, 1, 1], and
OCX2b=[1, -1, 1, -1, 1, -1, 1, -1].

In the sector radar #RD1, the orthogonal code multiplier 405a performs the multiplication process of the single-multiplication orthogonal codes to calculate
SAB·OCX1a,
SAB·OCX1b,
SEF·OCX1a, and
SEF·OCX1b.

In the sector radar #RD2, the orthogonal code multiplier 405b performs the multiplication process of the single-multiplication orthogonal codes to calculate
SCD·OCX2a,
SCD·OCX2b,
SGH·OCX2a, and
SGH·OCX2b.

Here, since SCD·OC2a is an operation of the Spano codes and the orthogonal codes, SCD·OC2a is represented as [-C, -D, -D', -C', -D, -C, -C', -D'].

Next, the orthogonal code controllers 404a and 404b use as the double-multiplication orthogonal codes
OCP1a1=1,
OCP1b1=1,
OCP1a2=1,
OCP1b2=-1,
OCP2a1=1,
OCP2b1=1,
OCP2a2=1, and
OCP2b2=-1, In the sector radar #RD1, the orthogonal code multiplier 405a performs the multiplication process of the double-multiplication orthogonal codes, in which the result of the multiplication process of the single-multiplication orthogonal codes is arranged twice, and then, the double-multiplication orthogonal codes are multiplied, to calculate
SAB·OCX1a·OCP1a1,
SAB·OCX1b·OCP1b1,
SEF·OCX1a·OCP1a1,
SEF·OCX1b·OCP1b1,
SAB·OCX1a·OCP1a2,
SAB·OCX1b·OCP1b2,
SEF·OCX1a·OCP1a2, and
SEF·OCX1b·OCP1b2.

In the sector radar #RD2, the orthogonal code multiplier 405b performs the multiplication process of the double-multiplication orthogonal codes, in which the result of the multiplication process of the single-multiplication orthogonal codes is arranged twice, and then, the double-multiplication orthogonal codes are multiplied, to calculate
SCD·OCX2a·OCP2a1,
SCD·OCX2b·OCP2b1,
SGH·OCX2a·OCP2a1,
SGH·OCX2b·OCP2b1,
SCD·OCX2a·OCP2a2,
SCD·OCX2b·OCP2b2,
SGH·OCX2a·OCP2a2, and
SGH·OCX2b·OCP2b2.

Next, the orthogonal code controllers 404a and 404b use OCQ1a, OCQ1b, OCQ2a, and OCQ2b as the triple-multiplication orthogonal codes. The triple-multiplication orthogonal codes OCQ1a, OCQ1b, and OCQ2a are vectors of which all components are 1 and the length is 64, and the triple-multiplication orthogonal code OCQ2b is a vector of which all components are -1 and the length is 64.

In the sector radar #RD1, the orthogonal code multiplier 405a performs the multiplication process of the triple-multiplication orthogonal codes, in which the result of the multiplication process of the double-multiplication orthogonal codes is arranged twice, and then, the triple-multiplication orthogonal codes are multiplied, to calculate
SAB·OCX1a·OCP1a1·OCQ1a,
SAB·OCX1b·OCP1b1·OCQ1a,
SEF·OCX1a·OCP1a1·OCQ1a,
SEF·OCX1b·OCP1b1·OCQ1a,
SAB·OCX1a·OCP1a2·OCQ1a,
SAB·OCX1b·OCP1b2·OCQ1a,
SEF·OCX1a·OCP1a2·OCQ1a,
SEF·OCX1b·OCP1b2·OCQ1a,
SAB·OCX1a·OCP1a1·OCQ1b,
SAB·OCX1b·OCP1b1·OCQ1b,
SEF·OCX1a·OCP1a1·OCQ1b,
SEF·OCX1b·OCP1b1·OCQ1b,
SAB·OCX1a·OCP1a2·OCQ1b,
SAB·OCX1b·OCP1b2·OCQ1b,
SEF·OCX1a·OCP1a2·OCQ1b, and
SEF·OCX1b·OCP1b2·OCQ1b.

In the sector radar #RD2, the orthogonal code multiplier 405b performs the multiplication process of the triple-multiplication orthogonal codes, in which the result of the multiplication process of the double-multiplication orthogonal codes is arranged twice, and then, the triple-multiplication orthogonal codes are multiplied, to calculate
SCD·OCX2a·OCP2a1·OCQ2a,
SCD·OCX2b·OCP2b1·OCQ2a
SGH·OCX2a·OCP2a1·OCQ2a,
SGH·OCX2b·OCP2b1·OCQ2a,
SCD·OCX2a·OCP2a2·OCQ2a,
SCD·OCX2b·OCP2b2·OCQ2a,
SGH·OCX2a·OCP2a2·OCQ2a,
SGH·OCX2b·OCP2b2·OCQ2a,
SCD·OCX2a·OCP2a1·OCQ2b,
SCD·OCX2b·OCP2b1·OCQ2b,
SGH·OCX2a·OCP2a1·OCQ2b,
SGH·OCX2b·OCP2b1·OCQ2b,
SCD·OCX2a·OCP2a2·OCQ2b,
SCD·OCX2b·OCP2b2·OCQ2b,
SGH·OCX2a·OCP2a2·OCQ2b, and
SGH·OCX2b·OCP2b2·OCQ2b.

Figure 14:
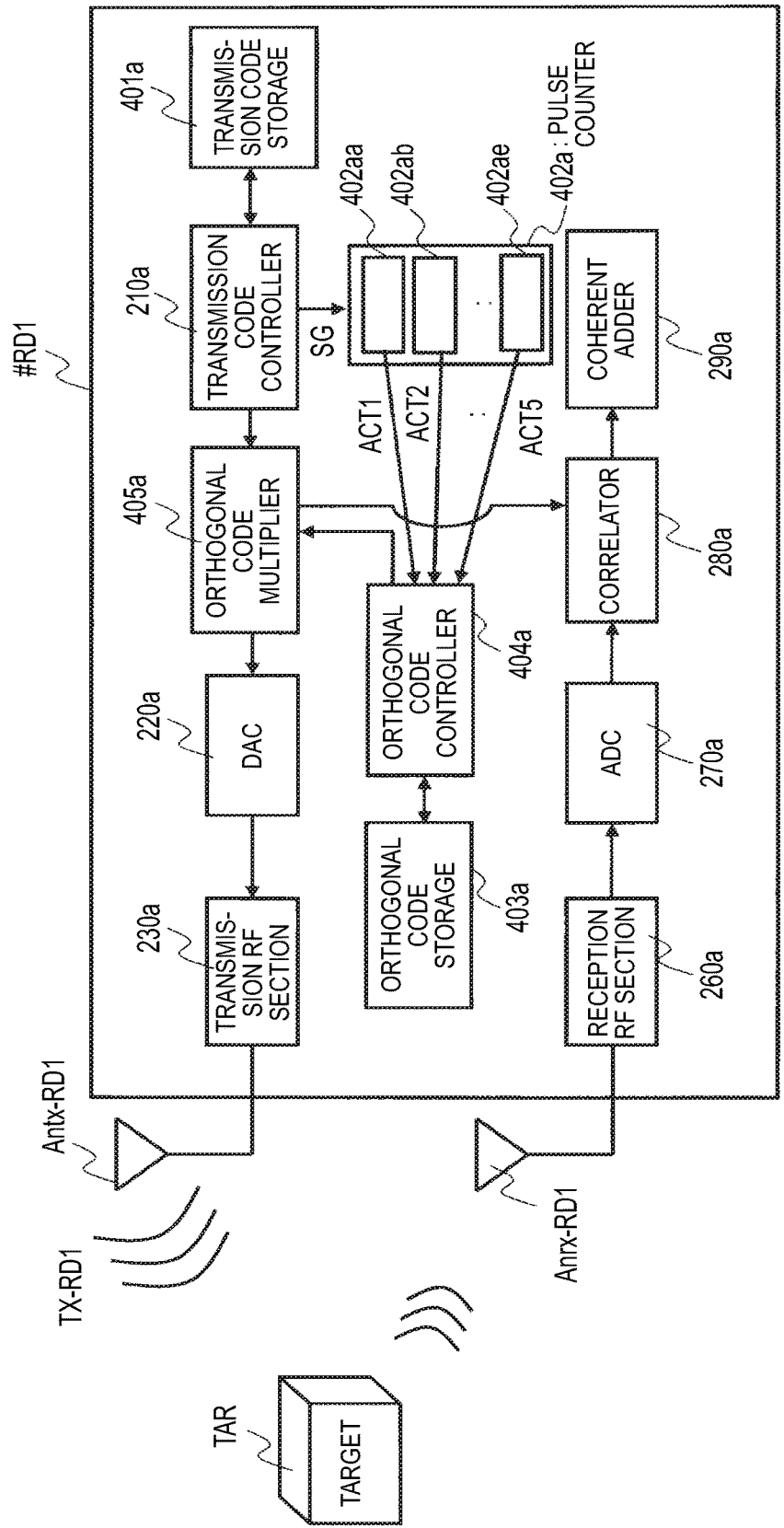
FIG. 14 is a block diagram illustrating an internal configuration of a sector radar #RD1 that forms a radar system according to a fourth embodiment.

FIGS. 13 and 14 are block diagrams illustrating internal configurations of the sector radars #RD1 and #RD2 that form the radar system of the fourth embodiment. A difference between the fourth and the third embodiment is that the number of counters included in the pulse counters 402a and 402b is different.

Operations of the pulse counters 402a and 402b will be described with reference to FIGS. 16 and 17. FIG. 17 is a diagram illustrating an example of the relationship between Spano code sequences, respective counter values, and orthogonal codes used in each of sector radars according to the fourth embodiment.

In the present embodiment, the counters ACT1 and BCT1 shown in FIG. 16 have sequential values of 1 to 8 whenever a transmission signal of Spano code sequences is transmitted. Eight pulses of [A, B, B', A', B, A, A', B] corresponding to the values 1 to 8 in which the value of the counter ACT1 is sequentially changed are recorded to be represented as SAB. Similarly; eight pulse values are recorded to be represented as SCD, SEF, and SGH.

Next, the values of the counters ACT2 and BCT2 are changed whenever the values of the counters ACT1 and BCT1 are counted up to 8 and become 1 or 2.

Next, in FIG. 17, the values of the counters ACT3 and BCT3 are changed whenever the values of the counters ACT2 and BCT2 are counted up to 2 and become 1 or 2.

Next, the counters ACT4 and BCT4 are changed whenever the counters ACT3 and BCT3 are counted up to 2 and become 1 or 2.

Next, the counters ACT5 and BCT5 are changed whenever the counters ACT4 and BCT4 are counted up to 2 and become 1 or 2.

Further, as the single-multiplication orthogonal codes (see "orthogonal codes 1" shown in FIG. 17), the orthogonal code controller 404a of the sector radar #RD1 selects the orthogonal codes OCX1a when the value of the counter ACT2 is 1, and selects the orthogonal codes OCX1b when the value of the counter ACT2 is 2, Similarly, as the single-multiplication orthogonal codes (see "orthogonal codes 1" shown in FIG. 17), the orthogonal code controller 404b of the sector radar #RD2 selects the orthogonal codes OCX2a when the value of the counter BCT2 is 1, and selects the orthogonal codes OCX2b when the value of the counter BCT2 is 2.

Further, as the double-multiplication orthogonal codes (see "orthogonal codes 2" shown in FIG. 17), the orthogonal code controller 404a of the sector radar #RD1 selects the orthogonal codes OCP1a1 when the value of the counter ACT2 is 1, selects the orthogonal codes OCP1b1 when the value of the counter ACT2 is 2 and the value of the counter ACT4 is 1, selects the orthogonal codes OCP1a2 when the value of the counter ACT2 is 1 and the value of the counter ACT4 is 2, and selects the orthogonal codes OCP1b2 when the value of the counter ACT2 is 2 and the value of the counter ACT4 is 2.

Similarly, as the double-multiplication orthogonal codes (see "orthogonal codes 2" shown in FIG. 17), the orthogonal code controller 404b of the sector radar #RD2 selects the orthogonal codes OCP2a1 when the value of the counter BCT2 is 1 and the value of the counter BCT4 is 1, selects the orthogonal codes OCP2b1 when the value of the counter BCT2 is 2 and the value of the counter BCT4 is 1, selects the orthogonal codes OCP2a2 when the value of the counter BCT2 is 1 and the value of the counter BCT4 is 2, and selects the orthogonal codes OCP2b2 when the value of the counter BCT2 is 2 and the value of the counter BCT4 is 2.

Further, as the triple multiplication orthogonal codes (see "orthogonal codes 3" shown in FIG. 17), the orthogonal code controller 404a of the sector radar #RD1 selects the orthogonal codes OCQ1a when the value of the counter ACT5 is 1, and selects the orthogonal codes OCQ1b when the value of the counter ACT5 is 2.

Similarly, as the triple-multiplication orthogonal codes (see "orthogonal codes 3" shown in FIG. 17), the orthogonal code controller 404b of the sector radar #RD2 selects the orthogonal codes OCQ2a when the value of the counter BCT5 is 1, and selects the orthogonal codes OCQ2b when the value of the counter BCT5 is 2.

Figure 15:
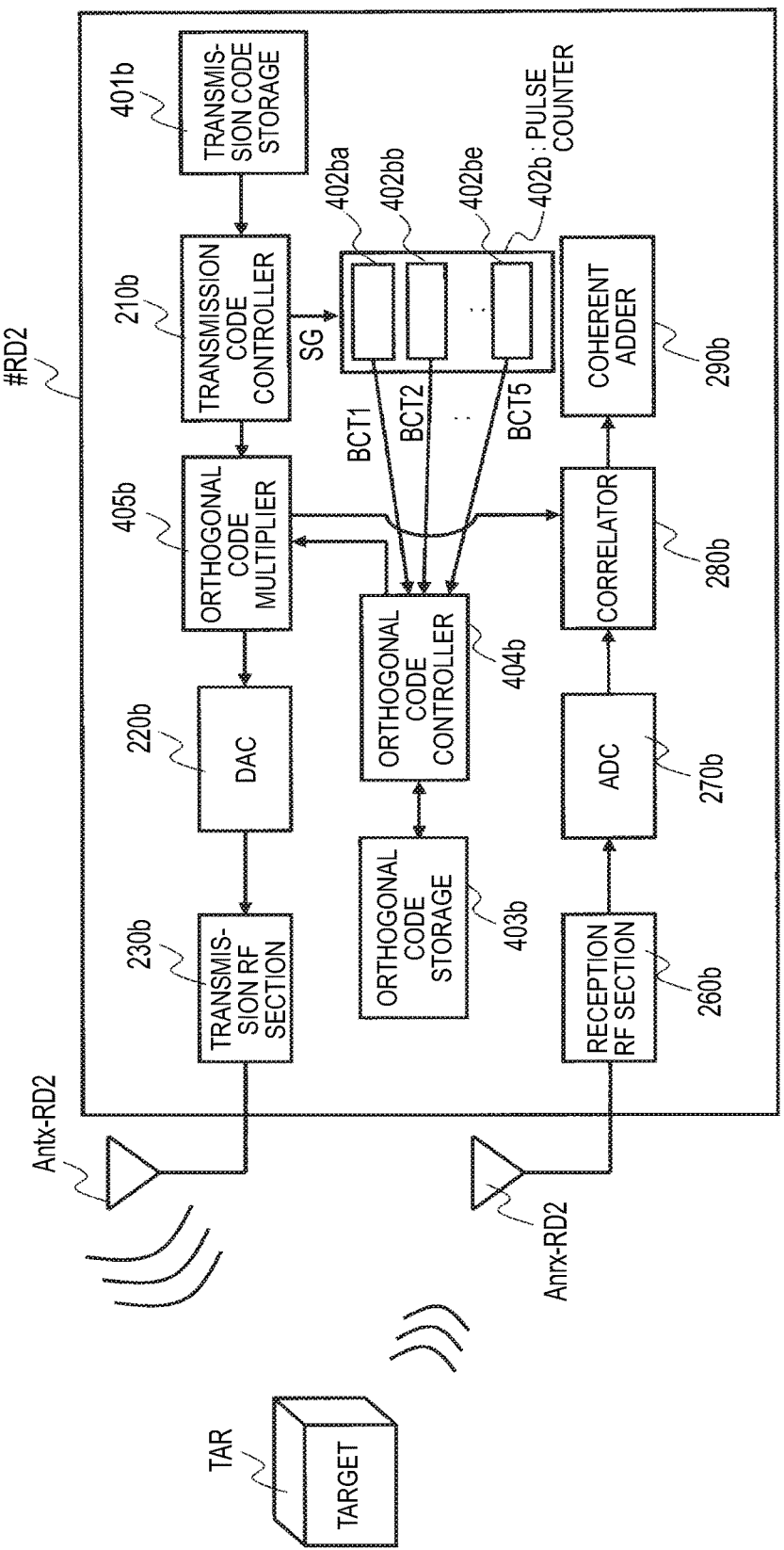
FIG. 15 is a block diagram illustrating an internal configuration of a sector radar #RD2 that forms the radar system according to the fourth embodiment.

Further, the orthogonal codes selected by the respective counters are multiplied by the transmission codes output from the transmission code controllers 210a and 210b in the orthogonal code multipliers 405a and 405h shown in FIGS. 14 and 15.

For example, in the sector radar #RD2, when the respective counter values in FIG. 17 are the value of the counter BCT2=2, the value of the counter BCT3=1, the value of the counter BCT4=2, and the value of the counter BCT5=1, respectively;

(1) the single-multiplication orthogonal codes are OCX2b having a code length of 8, that is, [1, −1, 1, −1, 1, −1, 1, −1], (2) the double-multiplication orthogonal codes are OCP2b2 having a code length of 1, that is, −1, and (3) the triple-multiplication orthogonal codes are OCQ2a that is a vector of which all components are 1 and the length is 64.

Thus, at the timings when the above-described counter values are obtained, eight pulses [C, D, D', C', D, C, C', D'] of SCD are transmitted.

The i-th pulse (for example, D' when i=3) of SCD is transmitted as a −D' pulse of $(+1)\times(-1)\times(+1)\times(D')=(-D')$ obtained by multiplication of the i-th code (for example, 1 when i=3) of the single-multiplication orthogonal codes OCX2b, the code −1 of the double-multiplication orthogonal codes OCP2b2, and the (40+i)-th code (for example, 1 when i=3) of the triple-multiplication orthogonal codes OCQ2a.

Since the orthogonal code OCQ2a is set to 1 from the time when the value of the counter BTC2 is 1, the value of the counter BCT3 is 1, the value of the counter BCT4 is 1, and the value of the counter BCT5 is 1, the orthogonal code OCQ2a is used after the fortieth code that is used up to the current counter setting, which becomes the (40+i)-th code.

As described above, the radar system of the present embodiment selects the above-described triple multiplication orthogonal codes for multiplication, to thereby make it possible to suppress the interference wave generated in the same transmission period from the other sector radar, the interference wave generated over the adjacent transmission periods from the own sector radar, and the interference wave generated over the adjacent transmission periods from the other sector radar.

Hereinbefore, the various embodiments have been described with reference to the accompanying drawings, but the present disclosure is not limited to the examples. It will be Obvious to those skilled in the art that various modifications and revisions can be made in the scope of claims, which can be interpreted as being included in the technical scope of the present disclosure.

In the above-described embodiments, the sector radar #RD1 may generate the first transmission signal using code sequences obtained by partially selecting two or four arbitrary code sequences from eight Spano code sequences (A, B, B', A', B, A, A', B'). Similarly, the sector radar #RD2 may generate the second transmission signal using code sequences obtained by partially selecting two or four arbitrary code sequences from eight Spano code sequences (C, D, D', C', D, C, C', D').

Further, as the Spano code sequences based on one set of complementary codes (A and B) or (C and D) mentioned in the above-described embodiments, Spano code sequences other than "A, B, B', A', B, A, A', B'", "A, B, B, A", "C, D, C', D', D, C, C', D'", and "C, D, D, C'" may be used. For example, as eight-sequence Spano codes, "A, B, B, A, B, A, A, B" or "A, B, D, C, B, A, C, D" may be used, and as four-sequence Spano codes, "A, B, B', A'" or "A, B, D, C" may be used.

This application is based on Japanese Patent Application No, 2013-032002 filed on Feb. 21, 2013, the contents of which are incorporated herein by reference.

INDUSTRIAL APPLICABILITY

The present disclosure is useful for a radar system that suppresses deterioration of a correlation characteristic of the reception signals and interference between plural sector radars, even when a phase rotation occurs in reception signals according to fluctuation of the Doppler frequency.

Further, the present disclosure may be used as a radar system capable of performing detection in a very wide angle range using plural sector radars, for example, as a radar system for infrastructure provided at an intersection, or as an on-vehicle radar mounted on a moving body such as a vehicle, for example.

REFERENCE SIGNS LIST

100: Radar system
210a: Transmission code controller
220: DAC
230: Transmission RF section
260: Reception RF section
270: ADC
280a: Correlator
290: Coherent adder
401: Transmission code storage
402, 402a, 402b: Pulse counter
403: Orthogonal code storage
404: Orthogonal code controller
405: Orthogonal code multiplier
Antx-RD1, Antx-RD2: Transmission antenna
Anrx-RD1, Anrx-RD2: Reception antenna
RD1, #RD2: Sector radar

The invention claimed is:

1. A radar system that includes at least two sector radars, the radar system comprising:
a first sector radar including
a first transmission signal generator that generates a first transmission signal by multiplying any one first Spano code and any one first orthogonal code selected among $2^{(N+1)}$ first Spano code sequences and $2^{(N+1)}$ first orthogonal code sequences, in a predetermined order in each transmission period, where N is an integer of 1 or greater, and
a first transmission RF section that converts the first transmission signal into a first high frequency signal and transmits the first frequency signal through a first transmission antenna; and
a second sector radar including
a second transmission signal generator that generates a second transmission signal by multiplying any one second Spano code and any one second orthogonal code selected among $2^{(N+1)}$ second Spano code sequences and $2^{(N+1)}$ second orthogonal code sequences, in a predetermined order in each transmission period, and
a second transmission RF section that converts the second transmission signal into a second high frequency signal and transmits the second high frequency signal through a second transmission antenna, wherein
the $2^{(N+1)}$ first orthogonal code sequences and the $2^{(N+1)}$ second orthogonal code sequences are orthogonal to each other over transmission periods of M multiples of the $2^{(N+1)}$, where M is an integer of 2 or greater.

2. The radar system according to claim 1, wherein
the first orthogonal code sequences include a plurality of types of orthogonal code sequences,
the first transmission signal generator generates the first transmission signal by multiplying the first Spano code sequences by the plurality of types of first orthogonal code sequences,
the second orthogonal code sequences include a plurality of types of orthogonal code sequences, and
the second transmission signal generator generates the second transmission signal by multiplying the second Spano code sequences by the plurality of types of second orthogonal code sequences.

3. The radar system according to claim 1, wherein
the first transmission signal generator includes
a first transmission code storage in which the $2^{(N+1)}$ first Spano code sequences are stored,
a first orthogonal code storage in which the $2^{(N+1)}$ first orthogonal code sequences are stored, and
a first orthogonal code multiplier that multiplies the any one first Spano code by the any one first orthogonal code in a predetermined order in each transmission period, and wherein
the second transmission signal generator includes
a second transmission code storage in which the $2^{(N+1)}$ second Spano code sequences are stored,
a second orthogonal code storage in which the $2^{(N+1)}$ second orthogonal code sequences are stored, and
a second orthogonal code multiplier that multiplies the any one second Spano code by the any one second orthogonal code in a predetermined order in each transmission period.

4. The radar system according to claim 1, wherein
the first sector radar includes
a first reception RF section that receives a reflected wave signal obtained as the first high frequency signal is reflected by a target through a first reception antenna and generates a reception baseband signal,
a first correlator that calculates a correlation value between the first transmission signal obtained by the multiplication of the first orthogonal codes and the reception baseband signal, and
a first coherent adder that adds first correlation values calculated over respective transmission periods of M multiples of $2^{(N+1)}$, and wherein
the second sector radar includes
a second reception RF section that receives a reflected wave signal obtained as the second high frequency signal is reflected by the target through a second reception antenna and generates a reception baseband signal,
a second correlator that calculates a correlation value between the second transmission signal obtained by the multiplication of the second orthogonal codes and the reception baseband signal, and a second coherent adder that adds second correlation values calculated over the respective transmission periods of M multiples of $2^{(N+1)}$.

5. The radar system according to claim 1, wherein N=M=2, the first orthogonal code sequence corresponding to first $2^{(N+1)}$ transmission periods is [1, 1, 1, 1, 1, 1, 1, 1], the first orthogonal code sequence corresponding to second $2^{(N+1)}$ transmission periods is [1, 1, 1, 1, 1, 1, 1, 1], the second orthogonal code sequence corresponding to $2^{(N+1)}$ transmission periods is [1, 1, 1, 1, 1, 1, 1, 1], and the second orthogonal code sequence corresponding to second $2^{(N+1)}$ transmission periods is [−1, −1, −1, −1, −1, −1, −1, −1].

6. The radar system according to claim 1, wherein N=M=2, the first orthogonal code sequence corresponding to first and second $2^{(N+1)}$ transmission periods is [1, −1, 1, −1, 1, −1, 1, −1], the second orthogonal code sequence corresponding to first $2^{(N+1)}$ transmission periods is [−1, 1, −1, 1, −1, 1, −1, 1], and the second orthogonal code sequence corresponding to second $2^{(N+1)}$ transmission periods is [1, −1, 1, −1, 1, −1, 1, −1].

7. The radar system according to claim 1, wherein N=M=2, the first orthogonal code sequence corresponding to first $2^{(N+1)}$ transmission periods is [1, 1, 1, 1, 1, 1, 1, 1], the first orthogonal code sequence corresponding to second $2^{(N+1)}$ transmission periods is [1, −1, 1, −1, 1, −1, 1, −1], the second orthogonal code sequence corresponding to first $2^{(N+1)}$ transmission periods is [−1, 1, −1, 1, −1, 1, −1, 1], and the second orthogonal code sequence corresponding to second $2^{(N+1)}$ transmission periods is [1, 1, 1, 1, 1, 1, 1, 1].

8. The radar system according to claim 1, wherein N=1 and M=2, the first orthogonal code sequence corresponding to first and second $2^{(N+1)}$ transmission periods is [1, −1, 1, −1], the second orthogonal code sequence corresponding to first $2^{(N+1)}$ transmission periods is [−1, 1, −1, 1], and the second orthogonal code sequence corresponding to second $2^{(N+1)}$ transmission periods is [1, −1, 1, −1].

9. The radar system according to claim 1, wherein N=1 and M=2, the first orthogonal code sequence corresponding to first $2^{(N+1)}$ transmission periods is [1, 1, 1, 1], the first orthogonal code sequence corresponding to second $2^{(N+1)}$ transmission periods is [1, −1, 1, −1], the second orthogonal code sequence corresponding to first $2^{(N+1)}$ transmission periods is [−1, 1, −1, 1], and the second orthogonal code sequence corresponding to second $2^{(N+1)}$ transmission periods is [1, 1, 1, 1].

10. The radar system according to claim 1, wherein N=1 and M=2, the first orthogonal code sequence corresponding to first and second $2^{(N+1)}$ transmission periods is [1, 1, 1, 1], the second orthogonal code sequence corresponding to first $2^{(N+1)}$ transmission periods is [1, 1, 1, 1], and the second orthogonal code sequence corresponding to second $2^{(N+1)}$ transmission periods is [−1, −1, −1, −1].

* * * * *